United States Patent
Piao et al.

(10) Patent No.: US 11,356,664 B2
(45) Date of Patent: *Jun. 7, 2022

(54) METHODS AND APPARATUSES FOR ENCODING AND DECODING VIDEO ACCORDING TO CODING ORDER

(71) Applicant: SAMSUNG ELECTRONICS CO., LTD., Suwon-si (KR)

(72) Inventors: Yin-ji Piao, Yongin-si (KR); Jie Chen, Beijing (CN); Chan-yul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,934

(22) Filed: Oct. 1, 2020

(65) Prior Publication Data

US 2021/0021826 A1   Jan. 21, 2021

Related U.S. Application Data

(63) Continuation of application No. 15/482,063, filed on Apr. 7, 2017, now Pat. No. 10,880,548.

(30) Foreign Application Priority Data

Nov. 24, 2016   (KR) .................. 10-2016-0157438

(51) Int. Cl.
*H04N 19/119* (2014.01)
*H04N 19/96* (2014.01)
(Continued)

(52) U.S. Cl.
CPC ......... *H04N 19/119* (2014.11); *H04N 19/129* (2014.11); *H04N 19/136* (2014.11); *H04N 19/176* (2014.11); *H04N 19/96* (2014.11)

(58) Field of Classification Search
CPC .. H04N 19/119; H04N 19/129; H04N 19/136; H04N 19/176
See application file for complete search history.

(56) References Cited

U.S. PATENT DOCUMENTS 8,891,889 B2   11/2014   Yu et al.
8,953,682 B2   2/2015   Chen et al.
(Continued)

FOREIGN PATENT DOCUMENTS

CN   102474613 A   5/2012
CN   104683809 A   6/2015
(Continued)

OTHER PUBLICATIONS

Communication dated Sep. 1, 2020 issued by the Korean Intellectual Property Office in Korean Application No. 10-2019-7027188.
(Continued)

*Primary Examiner* — Jeremiah C Hallenbeck-Huber
(74) *Attorney, Agent, or Firm* — Sughrue Mion, PLLC

(57) ABSTRACT

Provided is a video decoding method including obtaining split information indicating whether to split a current block; when the split information indicates that the current block is split, splitting the current block into at least two lower blocks; obtaining encoding order information indicating an encoding order of the at least two lower blocks of the current block; determining a decoding order of the at least two lower blocks according to the encoding order information; and decoding the at least two lower blocks according to the decoding order.

2 Claims, 25 Drawing Sheets

Related U.S. Application Data

(60) Provisional application No. 62/344,102, filed on Jun. 1, 2016.

(51) Int. Cl.
*H04N 19/129* (2014.01)
*H04N 19/136* (2014.01)
*H04N 19/176* (2014.01)

(56) References Cited

U.S. PATENT DOCUMENTS

| | | | |
|---|---|---|---|
| 9,379,736 | B2 | 6/2016 | Sole Rojals et al. |
| 10,136,129 | B2 | 11/2018 | Kim et al. |
| 10,375,401 | B2 | 8/2019 | Palfner et al. |
| RE48,224 | E | 9/2020 | Jung et al. |
| 2013/0064292 | A1* | 3/2013 | Song .................. H04N 19/11 375/240.03 |
| 2013/0287116 | A1 | 10/2013 | Helle et al. |
| 2014/0185671 | A1 | 7/2014 | Lee et al. |
| 2014/0341283 | A1 | 11/2014 | Choi et al. |
| 2015/0010048 | A1 | 1/2015 | Puri et al. |
| 2015/0098509 | A1* | 4/2015 | Sung .................. H04N 19/597 375/240.16 |
| 2016/0029028 | A1* | 1/2016 | Pu .................. H04N 19/463 375/240.24 |
| 2016/0073129 | A1 | 3/2016 | Lee et al. |
| 2016/0219276 | A1* | 7/2016 | Li .................. H04N 19/196 |
| 2016/0309177 | A1* | 10/2016 | Laroche .............. H04N 19/93 |
| 2017/0201750 | A1 | 7/2017 | Komiya et al. |
| 2020/0260087 | A1 | 8/2020 | Piao |

FOREIGN PATENT DOCUMENTS

| | | |
|---|---|---|
| CN | 105340274 A | 2/2016 |
| EP | 1 956 847 A1 | 8/2008 |
| JP | 4927753 B2 | 2/2012 |
| JP | 2015-167381 A | 9/2015 |
| KP | 1020140057188 A | 5/2014 |
| KR | 1020130031078 A | 3/2013 |
| KR | 10-2013-0085391 A | 7/2013 |
| KR | 10-2014-0088002 A | 7/2014 |
| KR | 10-1487686 B1 | 1/2015 |
| WO | 91/13514 A1 | 9/1991 |
| WO | 2014/120369 A1 | 8/2014 |
| WO | 2017/090967 A1 | 6/2017 |

OTHER PUBLICATIONS

"Series H: Audiovisual and Multimedia Systems, Infrastructure of Audiovisual Services—Coding of Moving Video", ITU-T, Telecommunication Standardization Sector of ITU, H.265, Apr. 2013, 317 pages total.

Mccann (Zetacast/Samsung) K, et al., "Samsung's Response to Call for Proposals on Video Compression Technology", Apr. 2010, Joint Collaborative Team on Video Coding (JCT-VC) of ITU-T SG16 WP3 and ISO/IEC JTC1/SC29/WG11, XP030007573, 42 pages total.

Communication dated Sep. 23, 2019, issued by the European Patent Office in counterpart European Application No. 17806887.0.

Li, X., et al., "Multi-Type-Tree", Oct. 2016, Joint Video Exploration Team (JVET) of ITU-T SG 16 WP 3 and ISO/IEC JTC 1/SC 29AVG 11, XP030150367, 3 pages total.

Communication dated Apr. 25, 2019, issued by the European Patent Office in counterpart European Application No. 17806887.0.

Shiodera, T., et al., "Block Based Extra/Inter-Polating Prediction for Intra Coding", Sep. 1, 2007, Image Processing, IEEE International Conference, XP031158358, 4 pages total.

International Search Report (PCT/ISA/210 and PCT/ISA/220) and Written Opinion (PCT/ISA/237), issued by International Searching Authority in corresponding International Application No. PCT/KR2017/004170, dated Jul. 18, 2017.

Kim, J., et al., "Enlarging MB size for high fidelity video coding beyond HD", Oct. 2008, ITU—Telecommunications Standardization Sector, XP030003643, 6 pages total.

Communication dated Mar. 18, 2021, issued by the European Patent Office in counterpart European Application No. 17806887.0.

Guo et al., "Hierarchical Quadtree-Based Flexible Block Ordering in HEVC Intra Coding," Visual Communications and Image Processing (VCIP) 2016, Nov. 2016, Total 4 pages, XP055784296.

Communication dated Jun. 10, 2021, issued by the Korean Patent Office in counterpart Korean Patent Application No. 10-2016-0157438.

Communication dated Jul. 5, 2021, issued by the Korean Patent Office in counterpart Korean Patent Application No. 10-2021-07019219.

Communication dated Jun. 23, 2021, issued by the State Intellectual Property Office of P.R. China in counterpart Chinese Application No. 201880047737.5.

Matsuda et al., "Interpolative Intra Prediction By Adapting Processing Order in Block-Based Image Coding" 2013 IEEE, ICIP, Feb. 13, 2014. pp. 1646-1650 (5 total pages).

Communication dated Nov. 29, 2021 by the Korean Intellectual Patent Office in Korean Application No. 10-2016-0157438.

Communication dated Jan. 4, 2022 by the National Intellectual Property Administration, PRC in Chinese Application No. 201780032518.5.

Communication dated Feb. 24, 2022 issued by the Indian Patent Office in counterpart Indian Partial English Application No. 201927050896.

* cited by examiner

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

METHODS AND APPARATUSES FOR ENCODING AND DECODING VIDEO ACCORDING TO CODING ORDER

CROSS-REFERENCE TO RELATED APPLICATION

This application is a Continuation of U.S. application Ser. No. 15/482,063 filed Apr. 7, 2017, which claims the benefit of U.S. Provisional Patent Application No. 62/344,102, filed on Jun. 1, 2016, in the U.S. Patent and Trademark Office, and priority from Korean Patent Application No. 10-2016-0157438, filed on Nov. 24, 2016, in the Korean Intellectual Property Office, the disclosures of which are incorporated herein by reference in their entireties.

BACKGROUND

1. Field

Methods and apparatuses consistent with exemplary embodiments of the present application relate to encoding and decoding a video, and more particularly, to an intra or inter prediction technique for determining encoding and decoding orders of an image.

2. Description of the Related Art

When a high quality video is encoded, a large amount of data is generated. However, because bandwidth allowed for transmission of the video data may be limited, a data rate applied to transmission of the video data may be correspondingly limited. Therefore, for efficient transmission of the video data, there is a need for video data encoding and decoding methods that provide maximum image quality with increased compression.

Video data may be compressed by spatial redundancy and temporal redundancy between pixels. Because spatially adjacent pixels and temporally adjacent pixels generally have a common characteristic, encoding information of a data unit consisting of pixels is transmitted to remove redundancy between the adjacent pixels.

Pixel values of the pixels included in a data unit are not directly transmitted, but instead information regarding a method of obtaining the pixel values is transmitted. A prediction method of predicting a pixel value that is similar to an original value is determined for each data unit, and encoding information regarding the prediction method is transmitted from an encoder to a decoder. Because a prediction value is not completely equal to the original value, residual data of a difference between the original value and the prediction value is also transmitted from the encoder to the decoder.

When prediction is exact, a data amount of the encoding information for specifying the prediction method may be increased, but a size of the residual data may be correspondingly decreased. Therefore, the prediction method is determined by taking into account sizes of the encoding information and the residual data. In particular, a data unit split from a picture may have one of various sizes, and in this regard, when a size of the data unit is increased, the accuracy of prediction may be decreased while an amount of encoding information is also decreased. Thus, a size of a block is determined according to a characteristic of a picture.

Prediction methods include intra prediction and inter prediction. Intra prediction involves predicting pixels of a block from neighboring pixels of the block. Inter prediction involves predicting pixels by referring to pixels of a different picture referred to by a picture including the block. Therefore, spatial redundancy is removed through intra prediction, and temporal redundancy is removed through the inter prediction.

When the number of prediction methods is increased, a size of encoding information for indicating the prediction method is also increased. Thus, when the encoding information to be applied to a block is predicted from a different block, the size of the encoding information may be decreased.

Finally, because loss of video data is allowed to the extent that human eyes cannot recognize the loss, residual data may be lossy-compressed according to transformation and quantization processes, and by doing so, an amount of the residual data may be decreased.

SUMMARY

Aspects of the exemplary embodiments provide a video encoding method including determining whether to split a current block and an encoding order of lower blocks. Aspects of the exemplary embodiments also provide a video decoding method including splitting a current block and determining an encoding order of split lower blocks. Aspects of the exemplary embodiments also provide is a non-transitory computer-readable recording medium having recorded thereon a program for executing the video encoding method and the video decoding method.

Additional aspects of the exemplary embodiments will be set forth in part in the description which follows and, in part, will be apparent from the description, or may be learned by practice of the presented embodiments.

According to an aspect of an exemplary embodiment, there is provided a video decoding including obtaining split information indicating whether to split a current block to be decoded; when the split information indicates to split the current block, splitting the current block into at least two lower blocks; obtaining encoding order information indicating an encoding order in which the at least two lower blocks of the current block are encoded; determining a decoding order of the at least two lower blocks according to the encoding order indicated by the encoding order information; and decoding the at least two lower blocks according to the decoding order.

According to an aspect of an exemplary embodiment, there is provided a video encoding method including determining an encoding order of lower blocks of a current block into which the lower blocks are split; determining whether to split the current block by comparing coding efficiency of the current block with coding efficiencies of the lower blocks according to the encoding order; and generating a bitstream comprising split information indicating whether to split the current block into the lower blocks.

According to an aspect of an exemplary embodiment, there is provided a video decoding apparatus including a block splitter configured to obtain split information indicating whether to split a current block to be decoded, and when the split information indicates to split the current block, to split the current block into at least two lower blocks; an encoding order determiner configured to obtain encoding order information indicating an encoding order in which the at least two lower blocks of the current block are encoded, and to determine a decoding order of the at least two lower blocks according to the encoding order indicated by the encoding order information; and a decoder configured to decode the at least two lower blocks according to the decoding order.

According to an aspect of an exemplary embodiment, there is provided a video encoding apparatus including a encoding order determiner configured to determine an encoding order of lower blocks of a current block into which the lower blocks are split; a block splitter configured to determine whether to split the current block by comparing coding efficiency of the current block with coding efficiencies of the lower blocks according to the encoding order; and an output unit configured to generate a bitstream comprising split information indicating whether to split the current block into the lower blocks.

BRIEF DESCRIPTION OF THE DRAWINGS

The above and other aspects will become apparent and more readily appreciated from the following description of the exemplary embodiments, taken in conjunction with the accompanying drawings in which:

FIG. 12 illustrates a process of determining a depth of a coding unit when a shape and size of the coding unit changes, when a plurality of coding units are determined when the coding unit is recursively split, according to an exemplary embodiment;

DETAILED DESCRIPTION OF EXEMPLARY EMBODIMENTS

Figure 1A:
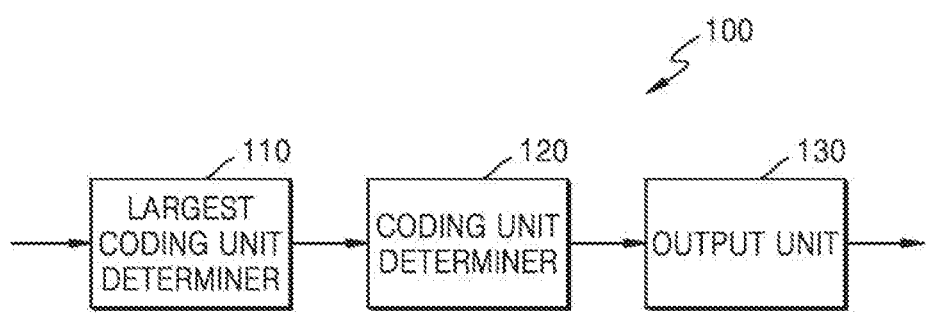
FIG. 1A illustrates a block diagram of an image encoding apparatus based on coding units according to a tree structure, according to an exemplary embodiment of the present disclosure.

Aspects of the present disclosure may be understood more readily by reference to the following detailed description of the embodiments and the accompanying drawings. In this regard, the present exemplary embodiments may have different forms and should not be construed as being limited to the descriptions set forth herein. Rather, these embodiments are provided so that this disclosure will be thorough and complete and will fully convey the concept of the present exemplary embodiments to one of ordinary skill in the art.

Hereinafter, the terms used in the specification will be briefly defined, and the embodiments will be described in detail.

All terms including descriptive or technical terms used herein should be construed as having meanings that would be understood by one of ordinary skill in the art. However, the terms may have different meanings according to the intention of one of ordinary skill in the art, precedent cases, or the appearance of new technologies. Also, some terms may be arbitrarily selected, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

The term "current block" refers to one of a coding unit, a prediction unit, and a transform unit which are currently to be encoded or decoded. In addition, the term "lower block" refers to a data unit split from the "current block". The term "upper block" refers to a data unit including the "current block".

Hereinafter, a "sample" is data allocated to a sampling location of an image and may be data that is a processing target. For example, pixel values in an image of a spatial domain or transform coefficients in a transformation domain may be samples. A unit including at least one sample may be defined as a block.

Reference will now be made in detail to embodiments, examples of which are illustrated in the accompanying drawings. In the following description, well-known functions or constructions are not described in detail so as not to obscure the embodiments with unnecessary detail.

As used herein, the term "and/or" includes any and all combinations of one or more of the associated listed items. Expressions such as "at least one of," when preceding a list of elements, modify the entire list of elements and do not modify the individual elements of the list.

FIG. 1A illustrates a block diagram of an image encoding apparatus 100 based on coding units according to a tree structure, according to an exemplary embodiment of the present disclosure.

The image encoding apparatus 100 includes a largest coding unit determiner 110, a coding unit determiner 120, and an output unit 130.

The largest coding unit determiner 110 splits a picture or a slice included in the picture into a plurality of largest coding units, according to a size of a largest coding unit. The largest coding unit may be a data unit having a size of 32×32, 64×64, 128×128, 256×256, etc., and a shape of the data unit may be a square having a width and length of $2^N$. The largest coding unit determiner 110 may provide largest coding unit size information indicating the size of the largest coding unit to the output unit 130. The output unit 130 may include the largest coding unit size information in a bitstream.

The coding unit determiner 120 determines coding units by splitting the largest coding unit. A coding unit may be determined by its largest size and depth. A depth may be defined as the number of times that the coding unit is spatially split from the largest coding unit. When the depth is increased by 1, the coding unit is split into at least two coding units. Therefore, when the depth is increased, sizes of coding units according to depths are each decreased. Whether to split a coding unit is determined according to whether splitting the coding unit is efficient according to rate-distortion optimization. Then, split information indicating whether the coding unit has been split may be generated. The split information may be expressed in a form one or more flags.

The coding unit may be split by using various methods. For example, a square coding unit may be split into four square coding units of which width and height are half of those of the square coding unit. The square coding unit may be split into two rectangular coding units of which width is half. The square coding unit may be split into two rectangular coding units of which height is half. The square coding unit may be split into three coding units in a manner that a width or height thereof is split by 1:2:1 or other ratio.

A rectangular coding unit of which width is twice as large as a height may be split into two square coding units. The rectangular coding unit of which width is twice as large as the height may be split into two rectangular coding units of which width is four times larger than a height. The rectangular coding unit of which width is twice as large as the height may be split into two rectangular coding units and one square coding unit in a manner that the width is split by 1:2:1 or other ratio.

Equally, a rectangular coding unit of which height is twice as large as a width may be split into two square coding units. The rectangular coding unit of which height is twice as large as the width may be split into two rectangular coding units of which height is four times larger than a width. Equally, the rectangular coding unit of which height is twice as large as the width may be split into two rectangular coding units and one square coding unit in a manner that the height is split by 1:2:1 or other ratio.

When the image encoding apparatus 100 is configured to implement two or more split methods, information regarding a split method that is applicable to a coding unit, the split method being from among the split methods that are available to the image encoding apparatus 100, may be determined for each picture. Therefore, only specific split methods may be used for each picture. When the image encoding apparatus 100 is configured to implement only one split method, the information regarding a split method that is applicable to a coding unit is not separately determined.

When split information of a coding unit indicates that the coding unit is split, split shape information indicating a split method with respect to the coding unit may be generated. If only one split method is usable in a picture including the coding unit, the split shape information may not be generated. If the split method is determined to be adaptive to encoding information adjacent to the coding unit, the split shape information may not be generated.

The largest coding unit may be split to smallest coding units according to smallest coding unit size information. A depth of the largest coding unit may be defined to be an uppermost depth, and a depth of the smallest coding units may be defined to be a lowermost depth. Therefore, a coding unit having an upper depth may include a plurality of coding units having a lower depth.

According to a largest size of a coding unit as described above, image data of a current picture is split into a largest coding unit. The largest coding unit may include coding units that are split according to depths. Because the largest coding unit is split according to the depths, image data of a spatial domain included in the largest coding unit may be hierarchically split according to the depths.

A maximum depth that limits the maximum number of hierarchically splitting the largest coding unit or a minimum size of a coding unit may be preset.

The coding unit determiner 120 compares coding efficiency of hierarchically splitting a current coding unit with coding efficiency of the current coding unit. Then, the coding unit determiner 120 determines whether to split the current coding unit according to a result of the comparison. When the coding unit determiner 120 determines that splitting the current coding unit is more efficient, the coding unit determiner 120 hierarchically splits the current coding unit. However, according to the result of the comparison, when the coding unit determiner 120 determines that maintaining the coding unit is more efficient for encoding, the coding unit determiner 120 does not split the current coding unit. Whether to split the current coding unit may be independently determined from whether a neighboring different coding unit is split.

According to an exemplary embodiment, whether to split the coding unit may be determined from a coding unit having a large depth, during an encoding procedure. For example, coding efficiency of a coding unit having a maximum depth is compared with coding efficiency of a coding unit having a depth that is less than the maximum depth by 1, and it is determined which one of coding units having the maximum depth and coding units having the depth that is less than the maximum depth by 1 is efficiently encoded in each area of a largest coding unit. According to a result of the determination, whether to split the coding units having the depth that is less than the maximum depth by 1 is determined in each area of the largest coding unit. Afterward, it is determined which one of coding units having a depth that is less than the maximum depth by 2 and one of the coding units having the maximum depth and the coding units having the depth that is less than the maximum depth by 1, the one having been selected according to the result of the determination, are further efficiently encoded in each area of the largest coding unit. The same determination process is performed on each of coding units having a smaller depth, and finally, whether to split the largest coding unit is determined according to which one of the largest coding unit and a hierarchical structure generated by hierarchically splitting the largest coding unit is further efficiently encoded.

Whether to split the coding unit may be determined from a coding unit having a small depth, during the encoding procedure. For example, coding efficiency of the largest coding unit is compared with coding efficiency of a coding unit of which depth is greater than the largest coding unit by 1, and it is determined which one of the largest coding unit and coding units of which depth is greater than the largest coding unit by 1 is efficiently encoded. When the coding efficiency of the largest coding unit is better, the largest coding unit is not split. When coding efficiency of the coding units of which depth is greater than the largest coding unit by 1 is better, the largest coding unit is split, and the comparison process is iteratively applied to split coding units.

When coding efficiency is examined from a coding unit having a large depth, calculation is large but a tree structure having high coding efficiency is obtained. On the contrary, when the coding efficiency is examined from a coding unit having a small depth, calculation is small but a tree structure having low coding efficiency is obtained. Therefore, in consideration of coding efficiency and calculation, an algorithm for obtaining a hierarchical tree structure of a largest coding unit may be designed by using various methods.

In order to determine coding efficiency of a coding unit according to each depth, the coding unit determiner 120 determines prediction and transformation methods that are most efficient to encode the coding unit. In order to determine the most efficient prediction and transformation methods, the coding unit may be split into predetermined data units. A data unit may have one of various shapes according to a method of splitting the coding unit. The method of splitting the coding unit which is performed to determine the data unit may be defined as a partition mode. For example, when a coding unit of 2 N×2 N (where N is a positive integer) is no longer split, a size of a prediction unit included in the coding unit is 2 N×2 N. When the coding unit of 2 N×2 N is split, the size of the prediction unit included in the coding unit may be 2 N×N, N×2 N, or N×N, according to the partition mode. The partition mode according to the present exemplary embodiment may generate symmetrical data units obtained by symmetrically splitting a height or width of the coding unit, data units obtained by asymmetrically splitting the height or width of the coding unit, such as by a ratio 1:n or n: 1, data units obtained by diagonally splitting the coding unit, data units obtained by geometrically splitting the coding unit, partitions having arbitrary shapes, or the like.

The coding unit may be predicted and transformed based on a data unit included in the coding unit. However, according to the present exemplary embodiment, a data unit for prediction and a data unit for transformation may be separately determined. The data unit for prediction may be defined as a prediction unit, and the data unit for transformation may be defined as a transform or transformation unit. A partition mode applied to the prediction unit and a partition mode applied to the transform unit may be different from each other, and prediction of the prediction unit and transformation of the transform unit may be performed in a parallel and independent manner in the coding unit.

To determine an efficient prediction method, the coding unit may be split into at least one prediction unit. Equally, to determine an efficient transformation method, the coding unit may be split into at least one transform unit. The split into the prediction unit and the split into the transform unit may be independently performed from each other. However, when a reconstructed sample in the coding unit is used in intra prediction, a dependent relation is formed between prediction units or transform units included in the coding unit, so that the split into the prediction unit and the transform unit may affect each other.

The prediction unit included in the coding unit may be predicted through intra prediction or inter prediction. The intra prediction involves predicting prediction-unit samples by using reference samples adjacent to the prediction unit. The inter prediction involves predicting prediction-unit samples by obtaining reference samples from a reference picture that is referred to by a current picture.

For the intra prediction, the coding unit determiner 120 may apply a plurality of intra prediction methods to the prediction unit, thereby selecting the most efficient intra prediction method. The intra prediction method includes directional modes such as a DC mode, a planar mode, a vertical mode, and a horizontal mode.

When a reconstructed sample adjacent to a coding unit is used as a reference sample, the intra prediction may be performed on each prediction unit. However, when a reconstructed sample in the coding unit is used as a reference sample, reconstruction with respect to the reference sample in the coding unit precedes prediction with respect to the reference sample in the coding unit, so that a prediction order of a prediction unit may depend on a transformation order of a transform unit. Therefore, when the reconstructed sample in the coding unit is used as the reference sample, only an intra prediction method for transform units corresponding to the prediction unit, and actual intra prediction may be performed on each transform unit.

The coding unit determiner 120 may determine an optimal motion vector and reference picture, thereby selecting the most efficient inter prediction method. For inter prediction, the coding unit determiner 120 may determine a plurality of motion vector candidates from a coding unit that is spatially and temporally adjacent to a current coding unit, and may determine, from among the motion vector candidates, the most efficient motion vector to be a motion vector. Equally, the coding unit determiner 120 may determine a plurality of reference picture candidates from the coding unit that is spatially and temporally adjacent to the current coding unit, and may determine the most efficient reference picture from among the reference picture candidates. In an exemplary embodiment, the reference picture may be determined from reference picture lists that are predetermined with respect to a current picture. In an exemplary embodiment, for accuracy of prediction, the most efficient motion vector from among the plurality of motion vector candidates may be determined to be a prediction motion vector, and a motion vector may be determined by compensating for the prediction motion vector. The inter prediction may be performed in parallel on each prediction unit in the coding unit.

The coding unit determiner 120 may reconstruct the coding unit by obtaining only information indicating the motion vector and the reference picture, according to a skip mode. According to the skip mode, all encoding information including a residual signal is skipped, except for the information indicating the motion vector and the reference picture. Because the residual signal is skipped, the skip mode may be used when accuracy of prediction is very high.

A partition mode to be used may be limited according to the prediction method for the prediction unit. For example, only partition modes for a prediction unit having a size of 2 N×2 N or N×N may be applied to intra prediction, whereas partition modes for a prediction unit having a size of 2 N×2 N, 2 N×N, N×2 N, or N×N may be applied to inter prediction. In addition, only a partition mode for a prediction unit having a size of 2 N×2 N may be applied to a skip mode of the inter prediction. The image encoding apparatus 100 may change a partition mode for each prediction method, according to coding efficiency.

The image encoding apparatus 100 may perform transformation based on a coding unit or a transform unit included in the coding unit. The image encoding apparatus 100 may transform residual data that is a difference value between an original value and a prediction value with respect to pixels included in the coding unit. For example, the image encoding apparatus 100 may perform lossy-compression on the residual data through quantization and discrete cosine transform (DCT)/discrete sine transform (DST). Alternatively, the image encoding apparatus 100 may perform lossless-compression on the residual data without the quantization.

The image encoding apparatus 100 may determine a transform unit that is the most efficient for quantization and transformation. The transform unit in the coding unit may be recursively split into smaller sized regions in a manner similar to that in which the coding unit is split according to the tree structure, according to an exemplary embodiment. Thus, residual data in the coding unit may be split according to the transform unit having the tree structure according to transformation depths. The image encoding apparatus 100 may generate transformation split information regarding splitting the coding unit and the transform unit according to the determined tree structure of the transform unit.

A transformation depth indicating the number of splits to reach the transform unit by splitting the height and width of the coding unit may also be set in the image encoding apparatus 100. For example, in a current coding unit of 2 N×2 N, a transformation depth may be 0 when the size of a transform unit is 2 N×2 N, may be 1 when the size of the transform unit is N×N, and may be 2 when the size of the transform unit is N/2×N/2. That is, the transform unit according to the tree structure may be set according to the transformation depth.

In conclusion, the coding unit determiner 120 determines a prediction method that is the most efficient for a current prediction unit and is from among a plurality of intra prediction methods and inter prediction methods. Then, the coding unit determiner 120 determines a prediction unit determination scheme according to coding efficiency according to a prediction result. Equally, the coding unit determiner 120 determines a transform unit determination scheme according to coding efficiency according to a transformation result. According to the most efficient prediction unit and transform unit determination scheme, coding efficiency of a coding unit is finally determined. The coding unit determiner 120 finalizes a hierarchical structure of a largest coding unit, according to coding efficiency of a coding unit according to each depth.

The coding unit determiner 120 may measure coding efficiency of coding units according to depths, prediction efficiency of prediction methods, or the like by using Rate-Distortion Optimization based on Lagrangian multipliers.

The coding unit determiner 120 may generate split information indicating whether to split a coding unit according to each depth according to the determined hierarchical structure of the largest coding unit. Then, the coding unit determiner 120 may generate, for split coding units, partition mode information to be used in determining a prediction unit and transform unit split information to be used in determining a transform unit. In addition, when the coding unit may be split by using at least two split methods, the coding unit determiner 120 may generate both split information and split shape information that indicates a split method. The coding unit determiner 120 may generate information regarding the prediction method and the transformation method that are used in the prediction unit and the transform unit.

The output unit 130 may output, in a bitstream, a plurality of pieces of information generated by the largest coding unit determiner 110 and the coding unit determiner 120 according to the hierarchical structure of the largest coding unit.

A method of determining the coding unit, the prediction unit, and the transform unit according to the tree structure of the largest coding unit will be described below with reference to FIGS. 3 through 12.

Figure 1B:
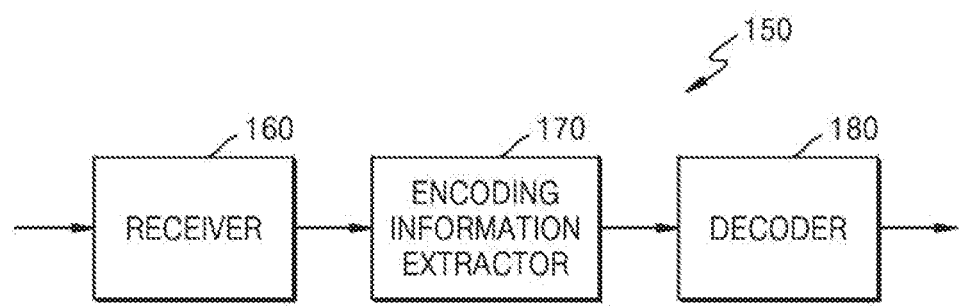
FIG. 1B illustrates a block diagram of an image decoding apparatus based on coding units according to a tree structure, according to an exemplary embodiment.

FIG. 1B illustrates a block diagram of an image decoding apparatus 150 based on coding units according to a tree structure, according to an exemplary embodiment.

The image decoding apparatus 150 includes a receiver 160, an encoding information extractor 170, and a decoder 180.

Definitions of the terms including a coding unit, a depth, a prediction unit, a transform unit, various split information, or the like for a decoding operation performed by the image decoding apparatus 150 are equivalent to those described above with reference to FIG. 1 and the image encoding apparatus 100. Because the image decoding apparatus 150 is designed to reconstruct image data, various encoding methods used by the image encoding apparatus 100 may also be applied to the image decoding apparatus 150.

The receiver 160 receives and parses a bitstream regarding an encoded video. The encoding information extractor 170 extracts, from the parsed bitstream, a plurality of pieces of information to be used in decoding largest coding units, and provides the information to the decoder 180. The encoding information extractor 170 may extract information regarding a largest size of a coding unit of a current picture from a header, a sequence parameter set, or a picture parameter set of the current picture.

The encoding information extractor 170 extracts, from the parsed bitstream, a final depth and split information regarding coding units according to a tree structure according to each largest coding unit. The extracted final depth and split information are output to the decoder 180. The decoder 180 may split a largest coding unit according to the extracted final depth and split information, thereby determining a tree structure of the largest coding unit.

The split information extracted by the encoding information extractor 170 is split information regarding the tree structure determined to generate a minimum encoding error, the determination being performed by the image encoding apparatus 100. Therefore, the image decoding apparatus 150 may reconstruct an image by decoding data according to a decoding scheme that generates the minimum encoding error.

The encoding information extractor 170 may extract split information regarding a data unit, such as a prediction unit and a transform unit included in the coding unit. For example, the encoding information extractor 170 may extract partition mode information regarding a partition mode that is the most efficient for the prediction unit. The encoding information extractor 170 may extract transformation split information regarding a tree structure that is the most efficient for the transform unit.

The encoding information extractor 170 may obtain information regarding the most efficient prediction method with respect to prediction units split from the coding unit. Then, the encoding information extractor 170 may obtain information regarding the most efficient transformation method with respect to transform units split from the coding unit.

The encoding information extractor 170 extracts the information from the bitstream, according to a method of configuring the bitstream, the method being performed by the output unit 130 of the image encoding apparatus 100.

The decoder 180 may split a largest coding unit into coding units having the most efficient tree structure, based on the split information. Then, the decoder 180 may split the coding unit into the prediction units according to the partition mode information. The decoder 180 may split the coding unit into the transform units according to the transformation split information.

The decoder 180 may predict the prediction units according to the information regarding the prediction method. The decoder 180 may perform inverse quantization and inverse transformation on residual data that is a difference between an original value and a prediction value of a pixel, according to information regarding a method of transforming a transform unit. The decoder 180 may reconstruct pixels of the coding unit, according to a result of the prediction on the prediction units and a result of the transformation on the transform units.

Figure 2:
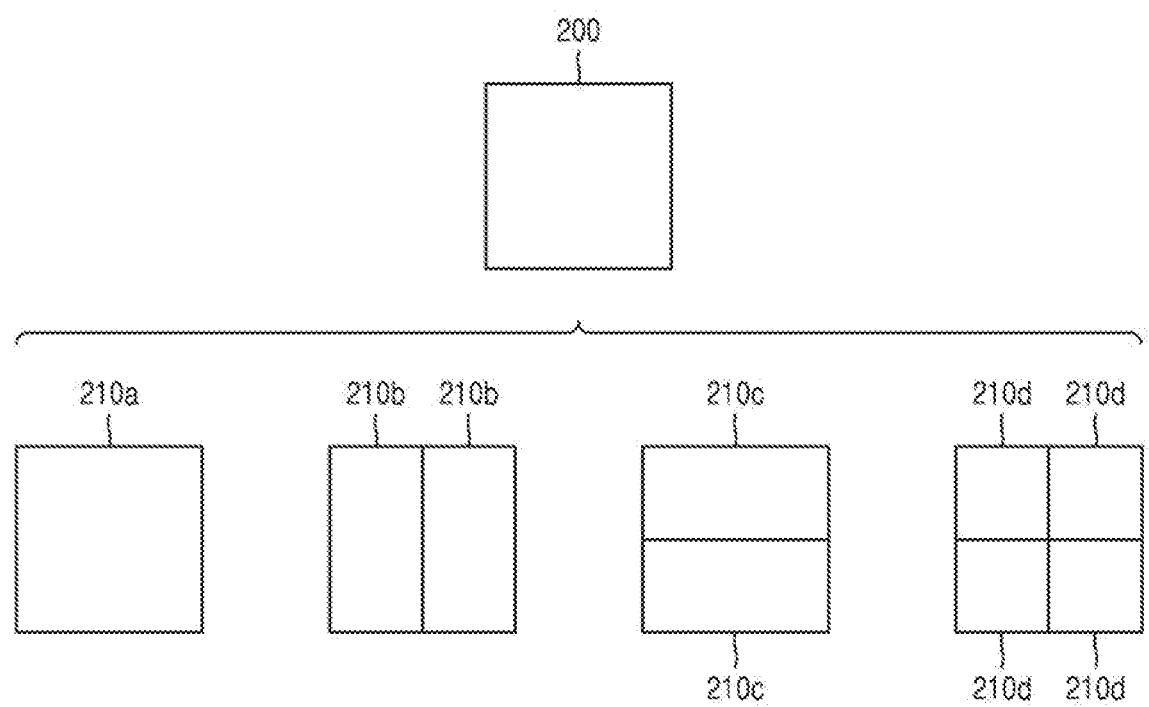
FIG. 2 illustrates a process of determining at least one coding unit when a current coding unit is split, according to an exemplary embodiment.

FIG. 2 illustrates a process of determining at least one coding unit when the image decoding apparatus 150 splits a current coding unit, according to an exemplary embodiment.

According to the present exemplary embodiment, the image decoding apparatus 150 may determine, by using block shape information, a shape of a coding unit, or may determine, by using split shape information, a shape according to which the coding unit is to be split. That is, a method of splitting a coding unit, which is indicated by the split shape information, may be determined based on which block shape is indicated by the block shape information used by the image decoding apparatus 150.

According to the present exemplary embodiment, the image decoding apparatus 150 may use the block shape information indicating that a current coding unit has a square shape. For example, the image decoding apparatus 150 may determine whether to split a square coding unit: whether to split the square coding unit vertically, whether to split the square coding unit horizontally, or whether to split the square coding unit into four coding units, according to the split shape information. Referring to FIG. 2, when block shape information of a current coding unit 200 indicates a square shape, the decoder 180 may not split a coding unit 210a having the same size as the current coding unit 200 according to split shape information indicating no split, or may determine coding units 210b, 210c, and 210d split based on split shape information indicating a predetermined split method.

Referring to FIG. 2, the image decoding apparatus 150 may determine the two coding units 210b obtained by splitting the current coding unit 200 in a vertical direction based on split shape information indicating split in a vertical direction, according to an exemplary embodiment. The image decoding apparatus 150 may determine the two coding units 210c obtained by splitting the current coding unit 200 in a horizontal direction based on split shape information indicating split in a horizontal direction. The image decoding apparatus 150 may determine the four coding units 210d obtained by splitting the current coding unit 200 in vertical and horizontal directions based on split shape information indicating split in vertical and horizontal directions. However, a split shape for splitting a square coding unit may not be limited to the above shapes, and may include various shapes that may be indicated by split shape information. Predetermined split shapes for splitting a square coding unit will be described in detail below through various embodiments.

Figure 3:
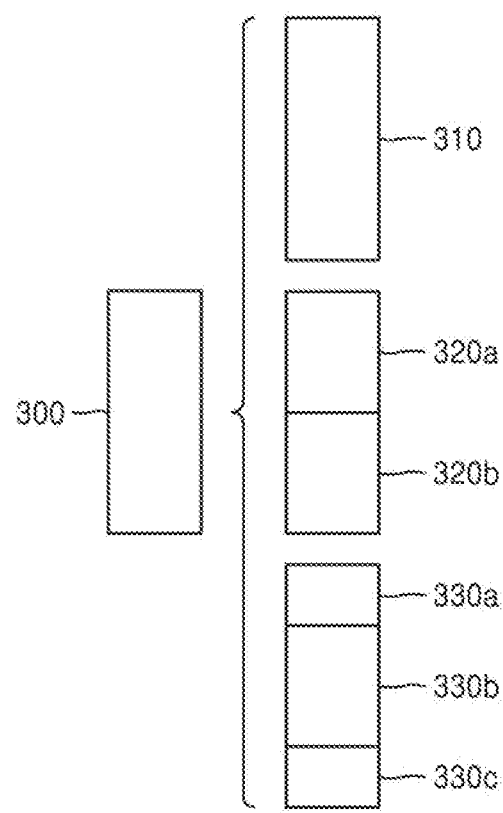
FIG. 3 illustrates a process of determining at least one coding unit when a coding unit having a non-square shape is split, according to an exemplary embodiment.
Figure 3:
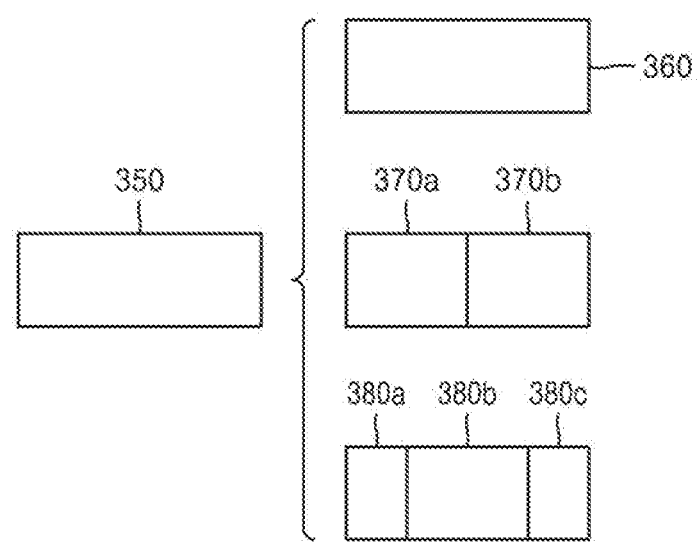

FIG. 3 illustrates a process of determining at least one coding unit when the image decoding apparatus 150 splits a coding unit having non-square shape, according to an exemplary embodiment.

According to the present exemplary embodiment, the image decoding apparatus 150 may use block shape information indicating that a current coding unit has a non-square shape. The image decoding apparatus 150 may determine whether to split the current coding unit having the non-square shape, or whether to split the current coding unit having the non-square shape by using a predetermined method. Referring to FIG. 3, when block shape information of a current coding unit 300 or 350 indicates a non-square shape, the image decoding apparatus 150 may not split a coding unit 310 or 360 having the same size as the current coding unit 300 or 350 according to split shape information indicating no split, or may determine coding units 320*a*, 320*b*, 330*a*, 330*b*, 330*c*, 370*a*, 370*b*, 380*a*, 380*b*, and 380*c* split according to split shape information indicating a predetermined split method. A predetermined split method of splitting a non-square coding unit will be described in detail below through various embodiments.

According to the present exemplary embodiment, the image decoding apparatus 150 may determine, by using the split shape information, a shape of a coding unit is split, and in this case, the split shape information may indicate the number of at least one coding unit generated when a coding unit is split. Referring to FIG. 3, when the split shape information indicates that the current coding unit 300 or 350 is split into two coding units, the image decoding apparatus 150 may determine the two coding units 320*a* and 320*b* or 370*a* and 370*b*, which are respectively included in the current coding unit 300 or 350 by splitting the current coding unit 300 or 350 based on the split shape information.

According to the present exemplary embodiment, when the image decoding apparatus 150 splits the current coding unit 300 or 350 having the non-square shape based on the split shape information, the image decoding apparatus 150 may split the current coding unit 300 or 350 having the non-square shape in consideration of a location of a longer side. For example, the image decoding apparatus 150 may determine a plurality of coding units by splitting the current coding unit 300 or 350 in a direction of splitting the longer sides of the current coding unit 300 or 350 in consideration of the shape of the current coding unit 300 or 350.

According to the present exemplary embodiment, when split shape information indicates that a coding unit is split into an odd number of blocks, the image decoding apparatus 150 may determine an odd number of coding units included in the current coding unit 300 or 350. For example, when split shape information indicates that the current coding unit 300 or 350 is split into three coding units, the image decoding apparatus 150 may split the current coding unit 300 or 350 into the three coding units 330*a*, 330*b*, and 330*c* or 380*a*, 380*b*, and 380*c*. According to the present exemplary embodiment, the image decoding apparatus 150 may determine the odd number of coding units included in the current coding unit 300 or 350, wherein sizes of the determined coding units are not the same. For example, a size of the coding unit 330*b* or 380*b* from among the odd number of coding units 330*a*, 330*b*, and 330*c* or 380*a*, 380*b*, and 380*c* may be different from sizes of the coding units 330*a* and 330*c* or 380*a* or 380*c*. That is, coding units that may be determined when the current coding unit 300 or 350 is split may have different types of sizes.

According to the present exemplary embodiment, when split shape information indicates that a coding unit is split into an odd number of blocks, the image decoding apparatus 150 may determine an odd number of coding units included in the current coding unit 300 or 350 and in addition, set a predetermined limit on at least one coding unit from among the odd number of coding units generated by splitting the current coding unit 300 or 350. Referring to FIG. 3, the image decoding apparatus 150 may decode the coding unit 330*b* or 380*b* at the center of the three coding units 330*a*, 330*b*, and 330*c* or 380*a*, 380*b*, and 380*c* generated when the current coding unit 300 or 350 is split in a different manner from the coding units 330*a* and 330*c* or 380*a* and 380*c*. For example, the image decoding apparatus 150 may limit the coding unit 330*b* or 380*b* at the center not to be further split unlike the coding units 330*a* and 330*c* or 380*a* and 380*c*, or to be split only a certain number of times.

Figure 4:
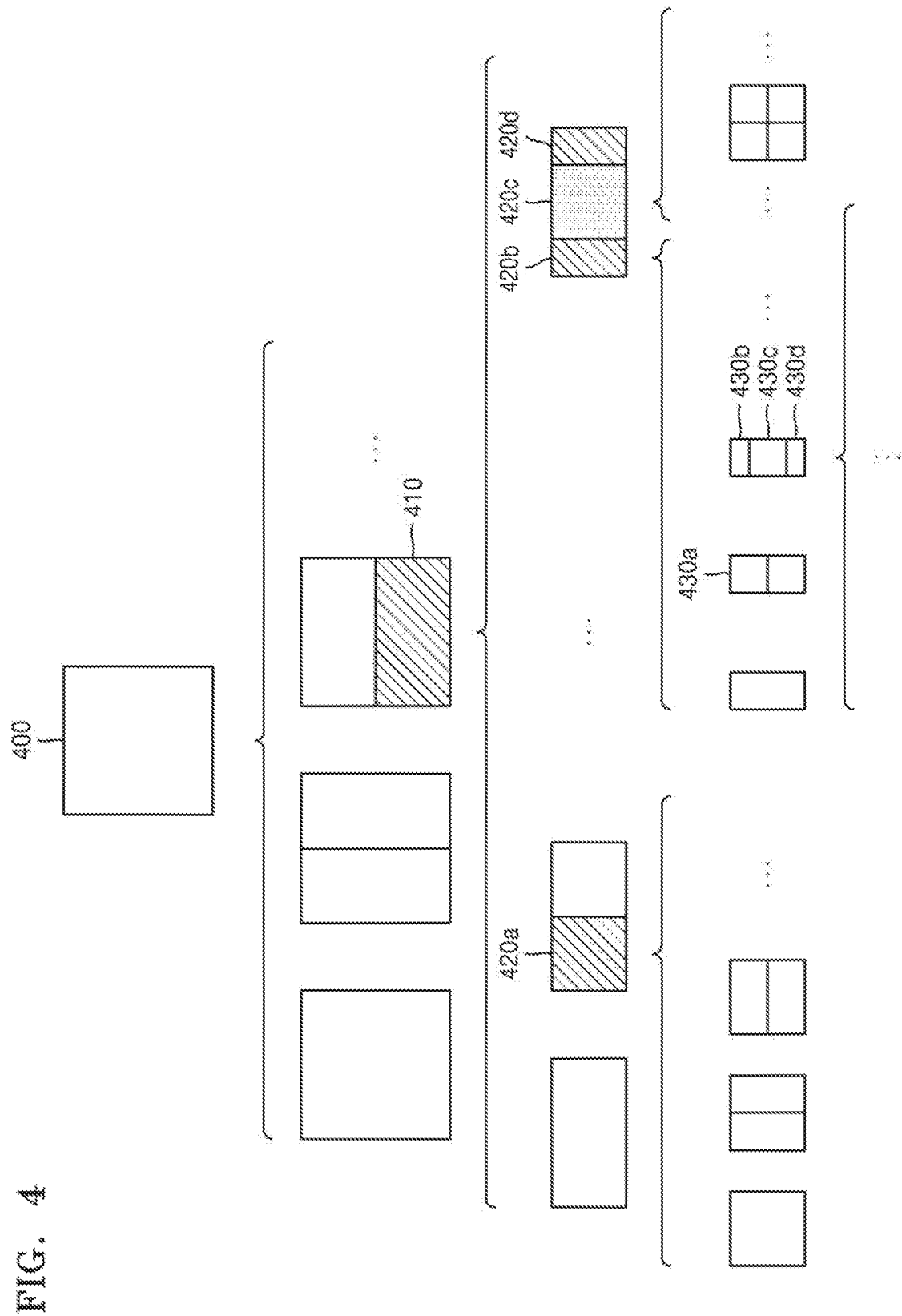
FIG. 4 illustrates a process of splitting a coding unit based on at least one of block shape information and split shape information, according to an exemplary embodiment.

FIG. 4 illustrates a process of splitting, by the image decoding apparatus 150, a coding unit based on at least one of block shape information and split shape information, according to an exemplary embodiment.

According to the present exemplary embodiment, the image decoding apparatus 150 may determine whether to split a first coding unit 400 having a square shape into coding units based on at least one of block shape information and split shape information. According to the present exemplary embodiment, when the split shape information indicates splitting of the first coding unit 400 in a horizontal direction, the image decoding apparatus 150 may determine a second coding unit 410 by splitting the first coding unit 400 in the horizontal direction. The terms "first coding unit", "second coding unit", and "third coding unit" according to an exemplary embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to the present exemplary embodiment, the image decoding apparatus 150 may determine whether to split the determined second coding unit 410 into coding units based on at least one of block shape information and split shape information. Referring to FIG. 4, the image decoding apparatus 150 may split the second coding unit 410, which has a non-square, rectangular shape determined by splitting the first coding unit 400, into at least one third coding unit, for example, third coding units 420*a*, 420*b*, 420*c*, and 420*d*, based on at least one of block shape information and split shape information, or may not split the second coding unit 410. The image decoding apparatus 150 may obtain at least one of block shape information and split shape information, the image decoding apparatus 150 may split the first coding unit 400 based on at least one of the block shape information and the split shape information to obtain a plurality of second coding units (for example, the second coding unit 410) having various shapes, and the second coding unit 410 may be split according to a manner of splitting the first coding unit 400 based on at least one of the block shape information and the split shape information. According to the present exemplary embodiment, when the first coding unit 400 is split into the second coding units 410 based on at least one of block shape information and split shape information about the first coding unit 400, the second coding unit 410 may also be split into the third coding units, for example, the third coding units 420*a*, 420*b*, and 420*c*, 420*d*, based on at least one of block shape information and split shape information about the second coding unit 410. That is, a coding unit may be recursively split based on at least one of split shape information and block shape information related to the coding unit. A method used to recursively split a coding unit will be described below through various embodiments.

According to the present exemplary embodiment, the image decoding apparatus 150 may determine to split each of the third coding units (for example, the third coding units 420*a*, 420*b*, 420*c*, and 420*d*) into coding units or not to split the second coding unit 410 based on at least one of block shape information and split shape information. The image decoding apparatus 150 may split the second coding unit 410 having a non-square shape into the odd number of third coding units 420*b*, 420*c*, and 420*d*. The image decoding apparatus 150 may set a predetermined limitation on a predetermined third coding unit from among the odd number of third coding units 420b, 420c, and 420d. For example, the image decoding apparatus 150 may limit the coding unit 420c located at the center from among the odd number of third coding units 420b, 420c, and 420d to no longer be split or to be split to a predetermined number of times. Referring to FIG. 4, the image decoding apparatus 150 may limit the coding unit 420c located at the center from among the odd number of third coding units 420b, 420c, and 420d included in the second coding unit 410 having a non-square shape to no longer be split, to be split into a predetermined split manner (for example, split only into four coding units or split into a shape corresponding to that into which the second coding unit 410 is split), or to be split only a predetermined number of times (for example, split only n times, wherein n>0). However, the limitations on the coding unit 420c located at the center are simply exemplary, and thus the present disclosure should not be interpreted limitedly to the above embodiments, and it should be interpreted that the limitations include various limitations of decoding the coding unit 420c located at the center differently from the coding units 420b and 420d.

According to the present exemplary embodiment, the image decoding apparatus 150 may obtain, from a predetermined location in a current coding unit, at least one of block shape information and split shape information used to split the current coding unit.

Figure 5:
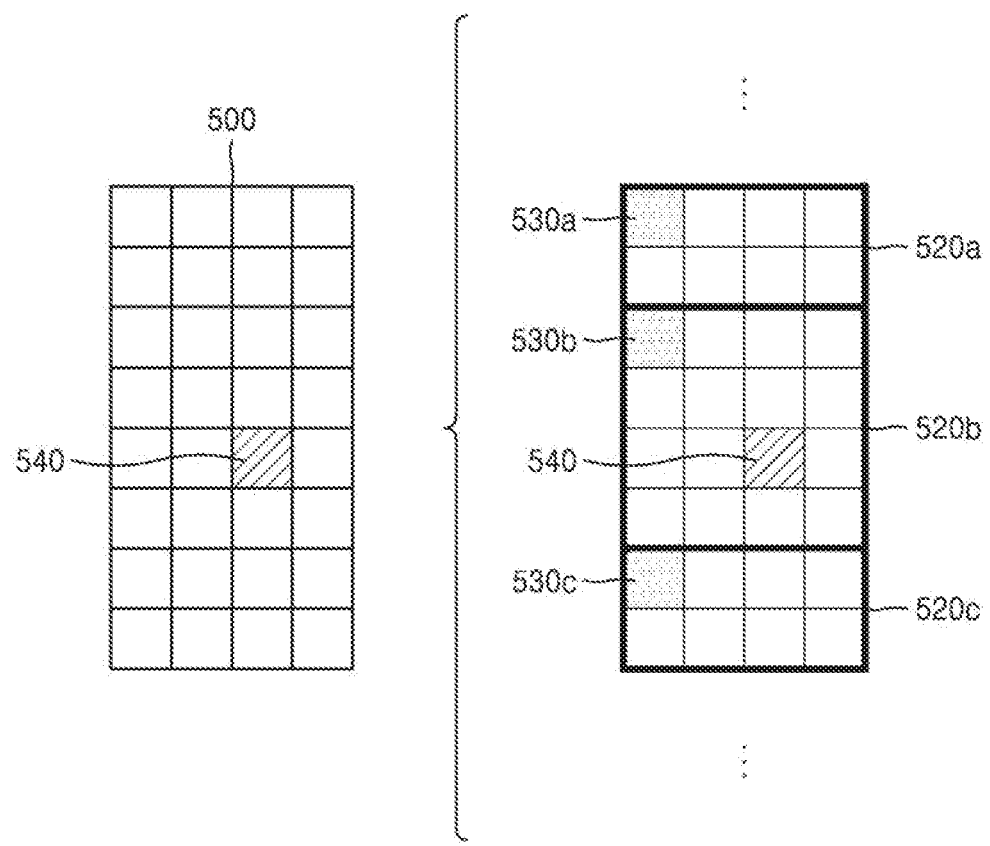
FIG. 5 illustrates a method of determining a predetermined coding unit from among an odd number of coding units, according to an exemplary embodiment.

FIG. 5 illustrates a method of determining, by the image decoding apparatus 150, a predetermined coding unit from among an odd number of coding units, according to an exemplary embodiment. Referring to FIG. 5, at least one of block shape information and split shape information of a current coding unit 500 may be obtained from a sample at a predetermined location (for example, a sample 540 located at the center) from among a plurality of samples included in the current coding unit 500. However, the predetermined location in the current coding unit 500 for obtaining at least one of the block shape information and the split shape information should not be limitedly interpreted to the center in FIG. 5, but should be interpreted to include various locations (for example, uppermost, lowermost, left, right, upper left, lower left, upper right, and lower right locations) in the current coding unit 500. The image decoding apparatus 150 may obtain at least one of the block shape information and the split shape information from the predetermined location to determine to split or not to split the current coding unit into coding units having various shapes and sizes.

According to the present exemplary embodiment, when the current coding unit is split into a predetermined number of coding units, the image decoding apparatus 150 may select one of the coding units. A method of selecting one of a plurality of coding units may vary, and descriptions about such a method will be described below through various embodiments.

According to the present exemplary embodiment, the image decoding apparatus 150 may split the current coding unit into the plurality of coding units, and may determine the coding unit at the predetermined location.

According to the present exemplary embodiment, the image decoding apparatus 150 may use information indicating a location of each of an odd number of coding units to determine a coding unit located at the center of the odd number of coding units. Referring to FIG. 5, the image decoding apparatus 150 may determine an odd number of coding units 520a, 520b, and 520c by splitting a current coding unit 500. The image decoding apparatus 150 may determine the coding unit 520b at the center by using information about locations of the odd number of coding units 520a, 520b, and 520c. For example, the image decoding apparatus 150 may determine the coding unit 520 located at the center by determining locations of the coding units 520a, 520b, and 520c based on information indicating locations of predetermined samples included in the coding units 520a, 520b, and 520c. In detail, the image decoding apparatus 150 may determine the coding unit 520b located at the center by determining the locations of the coding units 520a, 520b, and 520c based on information indicating locations of upper left samples 530a, 530b, and 530c of the coding units 520a, 520b, and 520c.

According to the present exemplary embodiment, the information indicating the locations of the upper left samples 530a, 530b, and 530c respectively included in the coding units 520a, 520b, and 520c may include information about locations or coordinates in a picture of the coding units 520a, 520b, and 520c. According to the present exemplary embodiment, the information indicating the locations of the upper left samples 530a, 530b, and 530c respectively included in the coding units 520a, 520b, and 520c may include information indicating widths or heights of the coding nits 520a, 520b, and 520c included in the current coding unit 500, wherein the widths or heights may correspond to information indicating differences between coordinates in the picture of the coding units 520a, 520b, and 520c. That is, the image decoding apparatus 150 may determine the coding unit 520b located at the center by directly using the information about the locations or coordinates in the picture of the coding units 520a, 520b, and 520c, or by using the information about the widths or heights of the coding units, which indicate difference values between coordinates.

According to the present exemplary embodiment, the information indicating the location of the upper left sample 530a of the top coding unit 520a may indicate (xa, ya) coordinates, information indicating the location of the upper left sample 530b of the center coding unit 520b may indicate (xb, yb) coordinates, and the information indicating the location of the upper left sample 530c of the bottom coding unit 520c may indicate (xc, yc) coordinates. The image decoding apparatus 150 may determine the center coding unit 520b by using the coordinates of the upper left samples 530a, 530b, and 530c respectively included in the coding units 520a, 520b, and 520c. For example, when the coordinates of the upper left samples 530a, 530b, and 530c are aligned in an ascending order or descending order, the center coding unit 520b including (xb, yb) that is coordinates of the upper left sample 530b may be determined as a coding unit located at the center from among the coding units 520a, 520b, and 520c determined when the current coding unit 500 is split. Here, the coordinates indicating the locations of the upper left samples 530a, 530b, and 530c may indicate coordinates indicating absolute locations in the picture, and further, may use (dxb, dyb) coordinates that are information indicating a relative location of the upper left sample 530b of the center coding unit 520b and (dxc, dyc) coordinates that are information indicating a relative location of the upper left sample 530c of the bottom coding unit 520c, based on the location of the upper left sample 530c of the top coding unit 520a. Also, a method of determining a coding unit at a predetermined location by using coordinates of a sample included in a coding unit as information indicating a location of the sample should not be limited to the above method, and may be interpreted to various arithmetic methods capable of using coordinates of a sample.

According to the present exemplary embodiment, the image decoding apparatus 150 may split the current coding unit 500 into the plurality of coding units 520a, 520b, and 520c, and select a coding unit from among the coding units 520a, 520b, and 520c according to predetermined criterion. For example, the image decoding apparatus 150 may select the coding unit 520b that has a different size from among the coding units 520a, 520b, and 520c.

According to the present exemplary embodiment, the image decoding apparatus 150 may determine the width or height of each of the coding units 520a, 520b, and 520c by using the (xa, ya) coordinates that are the information indicating the location of the upper left sample 530a of the top coding unit 520a, the (xb, yb) coordinates that are the information indicating the location of the upper left sample 530b of the center coding unit 520b, and the (xc, yc) coordinates that are the information indicating the location of the upper left sample 530c of the bottom coding unit 520c. The image decoding apparatus 150 may determine a size of each of the coding units 520a, 520b, and 520c by using the coordinates (xa, ya), (xb, yb), and (xc, yc) indicating the locations of the coding units 520a, 520b, and 520c.

According to an exemplary embodiment, the image decoding apparatus 150 may determine the width of the top coding unit 520a to xb-xa and the height to yb-ya. According to the embodiment, the image decoding apparatus 150 may determine the width of the center coding unit 520b to xc-xb and the height to yc-yb. According to the present exemplary embodiment, the image decoding apparatus 150 may determine the width or height of the bottom coding unit by using the width or height of the current coding unit, and the width and height of the top coding unit 520a and the center coding unit 520b. The image decoding apparatus 150 may determine one coding unit having a size different from other coding units based on the determined widths and heights of the coding units 520a, 520b, and 520c. Referring to FIG. 5, the image decoding apparatus 150 may determine, as the coding unit at the predetermined location, the center coding unit 520b having a size different from sizes of the top coding unit 520a and the bottom coding unit 520c. However, because a process of determining, by the image decoding apparatus 150, a coding unit having a size different from other coding units is only an exemplary embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limited to the upper left, but may be interpreted that information about a location of an arbitrary sample included in a coding unit.

According to the present exemplary embodiment, the image decoding apparatus 150 may select a coding unit at a predetermined location from among an odd number of coding units that are determined when a current coding unit is split, in consideration of a shape of the current coding unit. For example, when the current coding unit has a non-square shape in which a width is longer than a height, the image decoding apparatus 150 may determine the coding unit at the predetermined location along a horizontal direction. In other words, the image decoding apparatus 150 may determine a coding unit from among coding units having different locations in the horizontal direction, and may set a limitation on the coding unit. When the current coding unit has the non-square shape in which the height is longer than the width, the image decoding apparatus 150 may determine the coding unit at the predetermined location along a vertical direction. In other words, the image decoding apparatus 150 may determine a coding unit from among coding units having different locations in the vertical direction, and set a limitation on the coding unit.

According to the present exemplary embodiment, the image decoding apparatus 150 may use information indicating a location of each of an even number of coding units in order to determine a coding unit at a predetermined location from among the even number of coding units. The image decoding apparatus 150 may determine the even number of coding units by splitting a current coding unit, and determine the coding unit at the predetermined location by using the information about the locations of the even number of coding units. Detailed processes thereof may correspond to processes of determining a coding unit at a predetermined location (for example, a center location) from among an odd number of coding units, which have been described above with reference to FIG. 5, and thus descriptions thereof are not provided again.

According to the present exemplary embodiment, when a current coding unit having a non-square shape is split into a plurality of coding units, predetermined information about a coding unit at a predetermined location may be used during a split process in order to determine the coding unit at the predetermined location from among the plurality of coding units. For example, the image decoding apparatus 150 may use at least one of block shape information and split shape information, which are stored in a sample included in a center coding unit during a split process to determine a coding unit located at the center from among a plurality of coding units obtained by splitting a current coding unit.

Referring to FIG. 5, the image decoding apparatus 150 may split the current coding unit 500 into the plurality of coding units 520a, 520b, and 520c based on at least one of block shape information and split shape information, and determine the coding unit 520b located at the center from among the plurality of coding units 520a, 520b, and 520c. In addition, the image decoding apparatus 150 may determine the coding unit 520b located at the center in consideration of a location where at least one of the block shape information and the split shape information is obtained. That is, at least one of the block shape information and the split shape information of the current coding unit 500 may be obtained from the sample 540 located at the center of the current coding unit 500, and when the current coding unit 500 is split into the plurality of coding units 520a, 520b, and 520c based on at least one of the block shape information and the split shape information, the coding unit 520b including the sample 540 may be determined as the coding unit located at the center. However, information used to determine a coding unit located at the center should not be limited to at least one of block shape information and split shape information, and various types of information may be used during a process of determining a coding unit located at the center.

According to the present exemplary embodiment, predetermined information for identifying a coding unit at a predetermined location may be obtained from a predetermined sample included in a coding unit to be determined. Referring to FIG. 5, the image decoding apparatus 150 may use at least one of block shape information and split shape information obtained from a sample located at a predetermined location in the current coding unit 500 (for example, a sample located at the center of the current coding unit 500)

to determine a coding unit at a predetermined location from among the plurality of coding units 520a, 520b, and 520c determined when the current coding unit 500 is split (for example, a coding unit located at the center from among the plurality of coding units). That is, the image decoding apparatus 150 may determine the sample at the predetermined location in consideration of a block shape of the current coding unit 500, and the image decoding apparatus 150 may determine and set a predetermined limitation on the coding unit 520b including the sample from which predetermined location (for example, at least one of the block shape information and the split shape information) is obtained, from among the plurality of coding units 520a, 520b, and 520c determined when the current coding unit 500 is split. Referring to FIG. 5, the image decoding apparatus 150 may determine the sample 540 located at the center of the current coding unit 500, as the sample from which the predetermined information is obtained, and the image decoding apparatus 150 may set the predetermined location during a decoding process, on the coding unit 520b including the sample 540. However, a location of a sample from which predetermined information is obtained should not be limited to the above location, and the sample may be interpreted to samples at arbitrary locations included in the coding unit 520 determined to be limited.

According to the present exemplary embodiment, a location of a sample from which predetermined location is obtained may be determined based on a shape of the current coding unit 500. According to the present exemplary embodiment, block shape information may be used to determine whether a shape of a current coding unit is a square or a non-square, and a location of a sample from which predetermined information is obtained may be determined based on the shape. For example, the image decoding apparatus 150 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding apparatus 150 may determine, as a sample from which predetermined information is obtained, one of samples adjacent to a boundary of splitting a longer side of the current coding unit into halves.

According to the present exemplary embodiment, when a current coding unit is split into a plurality of coding units, the image decoding apparatus 150 may use at least one of block shape information and split shape information to determine a coding unit at a predetermined location from among the plurality of coding units. According to an exemplary embodiment, the image decoding apparatus 150 may obtain at least one of the block shape information and the split shape information from a sample at a predetermined location included in the coding unit, and the image decoding apparatus 150 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Because a recursive split process of a coding unit has been described above with reference to FIG. 4, details thereof are not provided again.

According to the present exemplary embodiment, the image decoding apparatus 150 may determine at least one coding unit by splitting a current coding unit, and determine an order of decoding the at least one coding unit according to a predetermined block (for example, a current coding unit).

Figure 6:
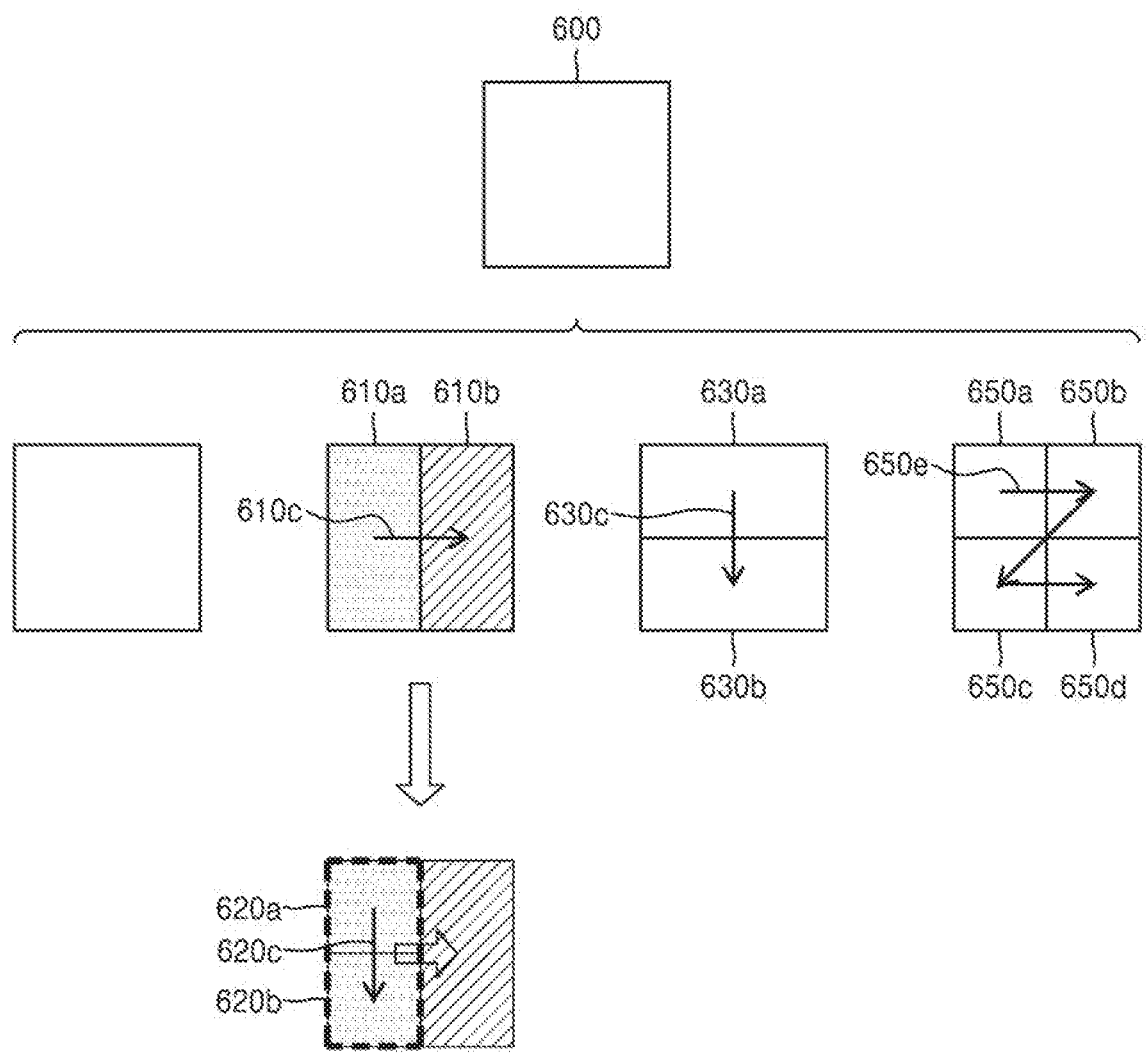
FIG. 6 illustrates an order of processing a plurality of coding units when the plurality of coding units are determined when a current coding unit is split, according to an exemplary embodiment.

FIG. 6 illustrates an order of processing a plurality of coding units when the image decoding apparatus 150 determines the plurality of coding units by splitting a current coding unit, according to an exemplary embodiment.

According to the present exemplary embodiment, the image decoding apparatus 150 may determine, according to block shape information and split shape information, second coding units 610a and 610b by splitting a first coding unit 600 in a vertical direction, second coding units 630a and 630b by splitting the first coding unit 600 in a horizontal direction, or second coding units 650a, 650b, 650c, and 650d by splitting the first coding unit 600 in vertical and horizontal directions.

Referring to FIG. 6, the image decoding apparatus 150 may determine an order such that the second coding units 610a and 610b determined by splitting the first coding unit 600 in the vertical direction to be processed in a horizontal direction 610c. The image decoding apparatus 150 may determine a processing order of the second coding units 630a and 630b determined by splitting the first coding unit 600 in the horizontal direction to be in a vertical direction 630c. The image decoding apparatus 150 may determine the second coding units 650a, 650b, 650c, and 650d determined by splitting the first coding unit 600 in the vertical and horizontal directions to be processed according to a predetermined order (for example, a raster scan order or a z-scan order 650e) in which coding units in one row are processed and then coding units in a next row are processed.

According to the present exemplary embodiment, the image decoding apparatus 150 may recursively split coding units. Referring to FIG. 6, the image decoding apparatus 150 may determine a plurality of coding units 610a, 610b, 630a, 630b, 650a, 650b, 650c, and 650d by splitting the first coding unit 600, and may recursively split each of the determined plurality of coding units 610a, 610b, 630a, 630b, 650a, 650b, 650c, and 650d. A method of splitting the plurality of coding units 610a, 610b, 630a, 630b, 650a, 650b, 650c, and 650d may be similar to a method of splitting the first coding unit 600. Accordingly, the plurality of coding units 610a, 610b, 630a, 630b, 650a, 650b, 650c, and 650d may each be independently split into a plurality of coding units. Referring to FIG. 6, the image decoding apparatus 150 may determine the second coding units 610a and 610b by splitting the first coding unit 600 in the vertical direction, and in addition, may determine to split or not to split each of the second coding units 610a and 610b independently.

According to the present exemplary embodiment, the image decoding apparatus 150 may split the left second coding unit 610a in the horizontal direction to obtain third coding units 620a and 620b, and may not split the right second coding unit 610b.

According to the present exemplary embodiment, a processing order of coding units may be determined based on a split process of coding units. In other words, a processing order of split coding units may be determined based on a processing order of coding units just before being split. The image decoding apparatus 150 may determine an order of processing the third coding units 620a and 620b determined when the left second coding unit 610a is split independently from the right second coding unit 610b. Because the third coding units 620a and 620b are determined when the left second coding unit 610a is split in the horizontal direction, the third coding units 620a and 620b may be processed in a vertical direction 620c. Also, because the order of processing the left second coding unit 610a and the right second coding unit 610b is in the horizontal direction 610c, the third coding units 620a and 620b included in the left second coding unit 610a may be processed in the vertical direction 620c and then the right second coding unit 610b may be processed. Because the above description is for describing a process of determining a processing order according to coding units before being split, the process should not be limited to the above embodiments, and various methods of independently processing coding units split and determined in various shapes according to a predetermined order may be used.

Figure 7:
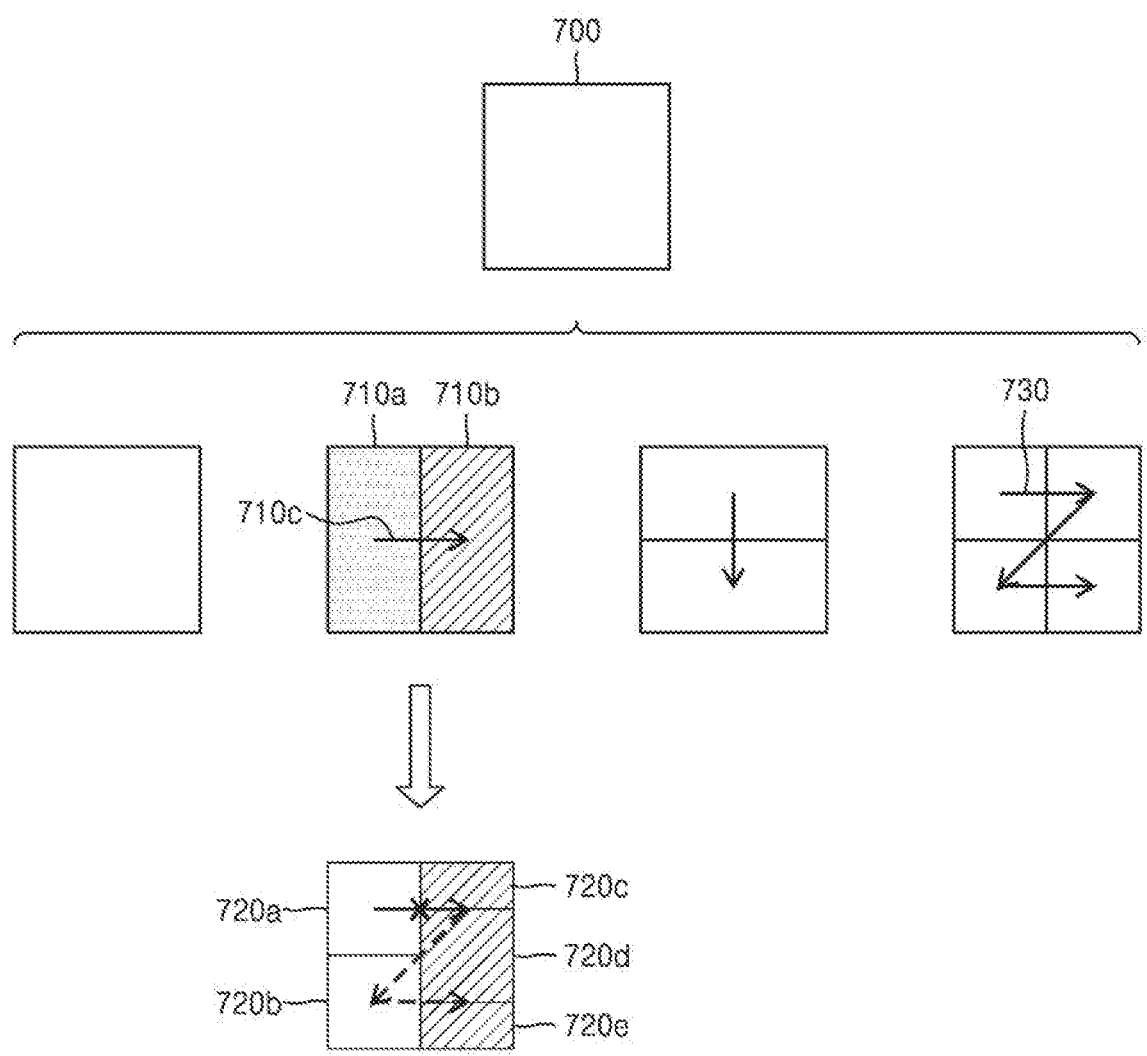
FIG. 7 illustrates a process of determining that a current coding unit is split into an odd number of coding units when coding units are unable to be processed in a predetermined order, according to an exemplary embodiment.

FIG. 7 illustrates a process of determining, by the image decoding apparatus 150, that a current coding unit is split into an odd number of coding units when coding units are unable to be processed in a predetermined order, according to an exemplary embodiment.

According to the present exemplary embodiment, the image decoding apparatus 150 may determine that the current coding unit is split into the odd number of coding units based on obtained block shape information and split shape information obtained by the bitstream obtainer 110. Referring to FIG. 7, a first coding unit 700 having a square shape may be split into second coding units 710a and 710b having non-square shapes, and the second coding units 710a and 710b may be independently split into third coding units 720a, 720b, 720c, 720d, and 720e. According to the present exemplary embodiment, the image decoding apparatus 150 may determine a plurality of the third coding units 720a and 720b by splitting the left coding unit 710a from among the second coding units in a horizontal direction, and the right coding unit 710b may be split into an odd number of the third coding units 720c, 720d, and 720e.

According to the present exemplary embodiment, the image decoding apparatus 150 may determine whether a coding unit split into an odd number exists by determining whether the third coding units 720a, 720b, 720c, 720d, and 720e are able to be processed in a predetermined order. Referring to FIG. 7, the image decoding apparatus 150 may determine the third coding units 720a, 720b, 720c, 720d, and 720e by recursively splitting the first coding unit 700. The image decoding apparatus 150 may determine, based on at least one of block shape information and split shape information, whether there is a coding unit split into an odd number from among the first coding unit 700, the second coding units 710a and 710b, and the third coding units 720a, 720b, 720c, 720d, and 720e. For example, a coding unit located at the right from among the second coding units 710a and 710b may be split into the odd number of third coding units 720c, 720d, and 720e. An order of processing a plurality of coding units included in the first coding unit 700 may be a predetermined order 730 (for example, a z-scan order), and the image decoding apparatus 150 may determine whether the third coding units 720c, 720d, and 720e determined when the right second coding unit 710b is split into an odd number satisfy a condition of being able to be processed according to the predetermined order.

According to the present exemplary embodiment, the image decoding apparatus 150 may determine whether the third coding units 720a, 720b, 720c, 720d, and 720e included in the first coding unit 700 satisfy a condition of being able to be processed according to a predetermined order, wherein the condition is related to whether at least one of a width and a height of the second coding units 710a and 710b is split into halves along boundaries of the third coding units 720a, 720b, 720c, 720d, and 720e. For example, the third coding units 720a and 720b that are determined when the left second coding unit 710a having a non-square shape is split into halves satisfy the condition, but the third coding units 720c, 720d, and 720e do not satisfy the condition because the boundaries of the third coding units 720c, 720d, and 720e that are determined when the right second coding unit 710b is split into three coding units are unable to split a width or height of the right second coding unit 710b into halves. Also, the image decoding apparatus 150 may determine disconnection of a scan order when the condition is not satisfied, and determine that the right second coding unit 710b is split into an odd number of coding units based on the determination result. According to the present exemplary embodiment, when a coding unit is split into an odd number of coding units, the image decoding apparatus 150 may set a predetermined limitation on a coding unit at a predetermined location from among the coding units, and because details about the limitation or the predetermined location have been described above through various embodiments, details thereof are not provided again.

Figure 8:
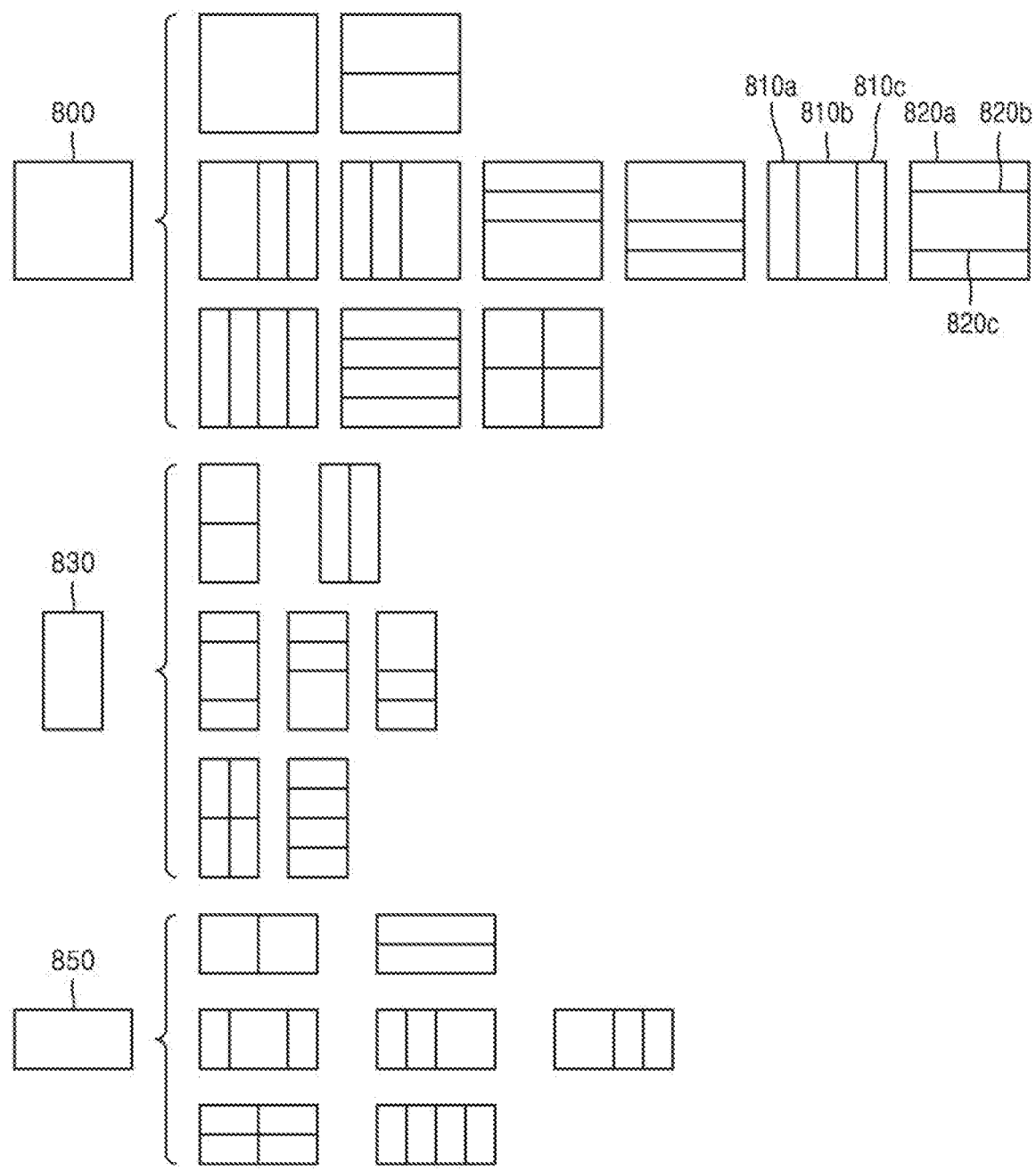
FIG. 8 illustrates a process of determining at least one coding unit when a first coding unit is split, according to an exemplary embodiment.

FIG. 8 illustrates a process of determining, by the image decoding apparatus 150, at least one coding unit when a first coding unit 800 is split, according to an exemplary embodiment. According to the present exemplary embodiment, the image decoding apparatus 150 may split the first coding unit 800 based on at least one of block shape information and split shape information obtained through the receiver 160. The first coding unit 800 having a square shape may be split into four coding units having square shapes or non-square shapes. For example, referring to FIG. 8, when block shape information indicates that the first coding unit 800 is a square and split shape information indicates that the first coding unit 800 is split into non-square coding units, the image decoding apparatus 150 may split the first coding unit 800 into a plurality of non-square coding units. In detail, when the split shape information indicates that the first coding unit 800 is split into a horizontal or vertical direction to determine an odd number of coding units, the image decoding apparatus 150 may split the first coding unit 800 having a square shape into, as the odd number of coding units, second coding units 810a, 810b, and 810c determined when the first coding unit 800 is split in the vertical direction, or second coding units 820a, 820b, and 820c determined when the first coding unit 800 is split in the horizontal direction.

According to the present exemplary embodiment, the image decoding apparatus 150 may determine whether the second coding units 810a, 810b, and 810c and 820a, 820b, and 820c included in the first coding unit 800 satisfy a condition of being able to be processed according to a predetermined order, wherein the condition is related to whether at least one of the width and the height of the first coding unit 800 is split into halves along the boundaries of the second coding units 810a, 810b, and 810c and 820a, 820b, and 820c. Referring to FIG. 8, because the boundaries of the second coding units 810a, 810b, and 810c determined when the first coding unit 800 having a square shape is split in the vertical direction are unable to split the width of the first coding unit 800 into halves, it may be determined that the first coding unit 800 does not satisfy the condition of being able to be processed according to the predetermined order. Also, because the boundaries of the second coding units 820a, 820b, and 820c determined when the first coding unit 800 having a square shape is split in the horizontal direction are unable to split the width of the first coding unit 800 into halves, it may be determined that the first coding unit 800 does not satisfy the condition of being able to be processed according to the predetermined order. When the condition is not satisfied, the image decoding apparatus 150 determines disconnection of a scan order and may determine that the first coding unit 800 is split into an odd number of coding units based on the determination result. According to the present exemplary embodiment, when a coding unit is split into an odd number of coding units, the image decoding apparatus 150 may set a predetermined limitation on a coding unit at a predetermined location from among the coding units, and because details about the limitation or the predetermined location have been described above through various embodiments, details thereof are not provided again.

According to the present exemplary embodiment, the image decoding apparatus 150 may determine coding units having various shapes by splitting a first coding unit.

Referring to FIG. 8, the image decoding apparatus 150 may split the first coding unit 800 having a square shape and a first coding unit 830 or 850 having a non-square shape into coding units having various shapes.

Figure 9:
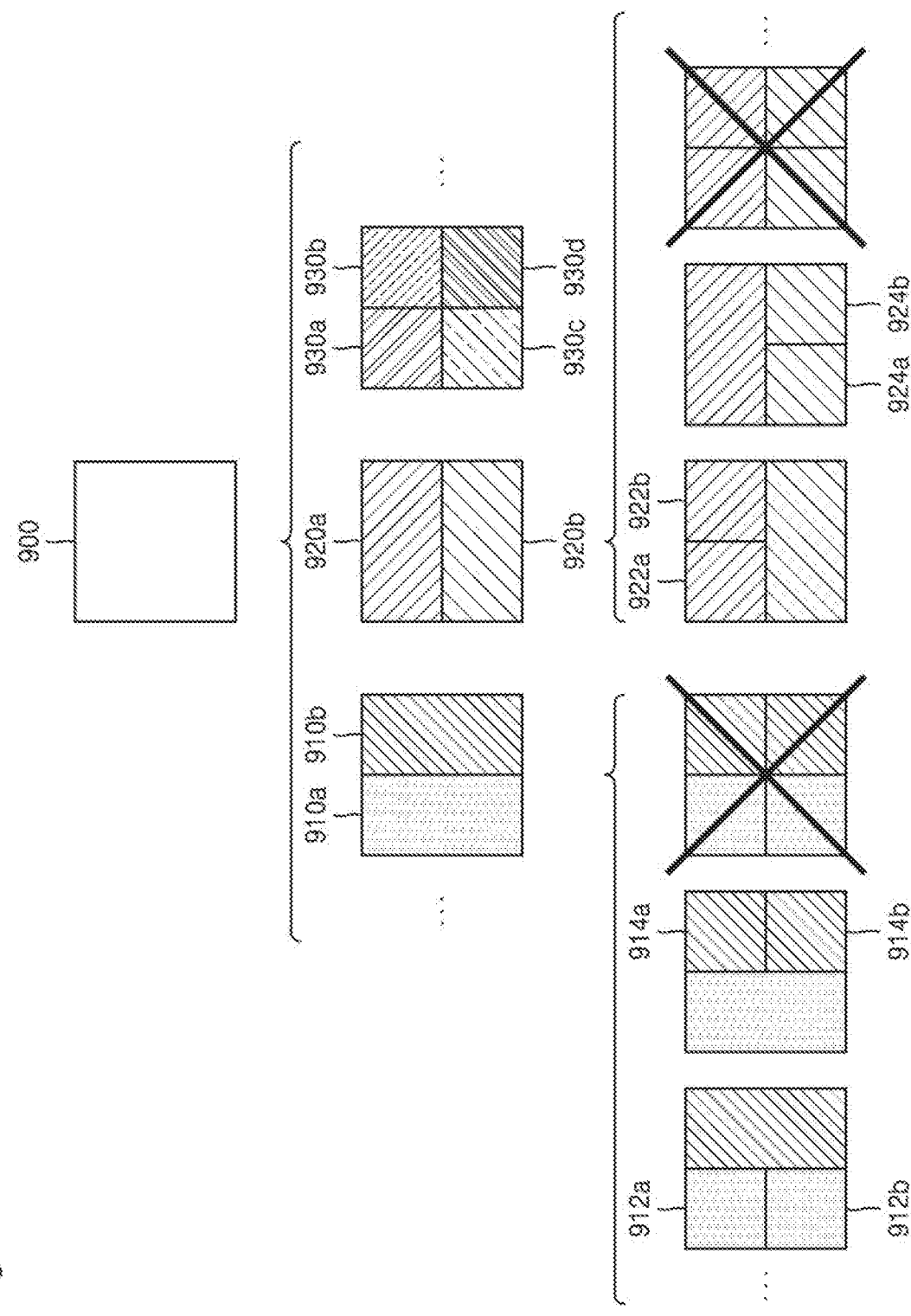
FIG. 9 illustrates that a shape of a second coding unit that is able to be split is limited when the second coding unit having a non-square shape, which is determined when a first coding unit is split, satisfies a predetermined condition, according to an exemplary embodiment.

FIG. 9 illustrates that a shape of a second coding unit that is able to be split is limited by the image decoding apparatus 150 when the second coding unit having a non-square shape, which is determined when a first coding unit 900 is split, satisfies a predetermined condition, according to an exemplary embodiment.

According to the present exemplary embodiment, the image decoding apparatus 150 may determine, based on at least one of block shape information and split shape information obtained through the receiver 160, to split the first coding unit 900 having a square shape into second coding units 910a, 910b, 920a, and 920b having non-square shapes. The second coding units 910a, 910b, 920a, and 920b may be independently split. Accordingly, the image decoding apparatus 150 may determine to split or not to split the second coding units 910a, 910b, 920a, and 920b based on at least one of block shape information and split shape information related to each of the second coding units 910a, 910b, 920a, and 920b. According to the present exemplary embodiment, the image decoding apparatus 150 may determine third coding units 912a and 912b by splitting the left second coding unit 910a having a non-square shape and determined when the first coding unit 900 is split in a vertical direction. However, when the left second coding unit 910a is split in a horizontal direction, the image decoding apparatus 150 may limit the right second coding unit 910b not to be split in the horizontal direction like a direction in which the left second coding unit 910a is split. When the right second coding unit 910b is split in the same direction and third coding units 914a and 914b are determined, the third coding units 912a, 912b, 914a, and 914b may be determined when the left second coding unit 910a and the right second coding unit 910b are independently split in the horizontal direction. However, this is the same result as the image decoding apparatus 150 splitting the first coding unit 900 into four second coding nits 930a, 930b, 930c, and 930d having square shapes based on at least one of block shape information and split shape information, and thus may be inefficient in terms of image decoding.

According to the present exemplary embodiment, the image decoding apparatus 150 may determine third coding units 922a, 922b, 924a, and 924b by splitting the second coding units 920a or 920b having a non-square shape and determined when the first coding unit 800 is split in the horizontal direction. However, when one of second coding units (for example, the top second coding unit 920a) is split in the vertical direction, the image decoding apparatus 150 may limit the other second coding unit (for example, the bottom second coding unit 920b) not to be split in the vertical direction like a direction in which the top second coding unit 920a is split based on the above reasons.

Figure 10:
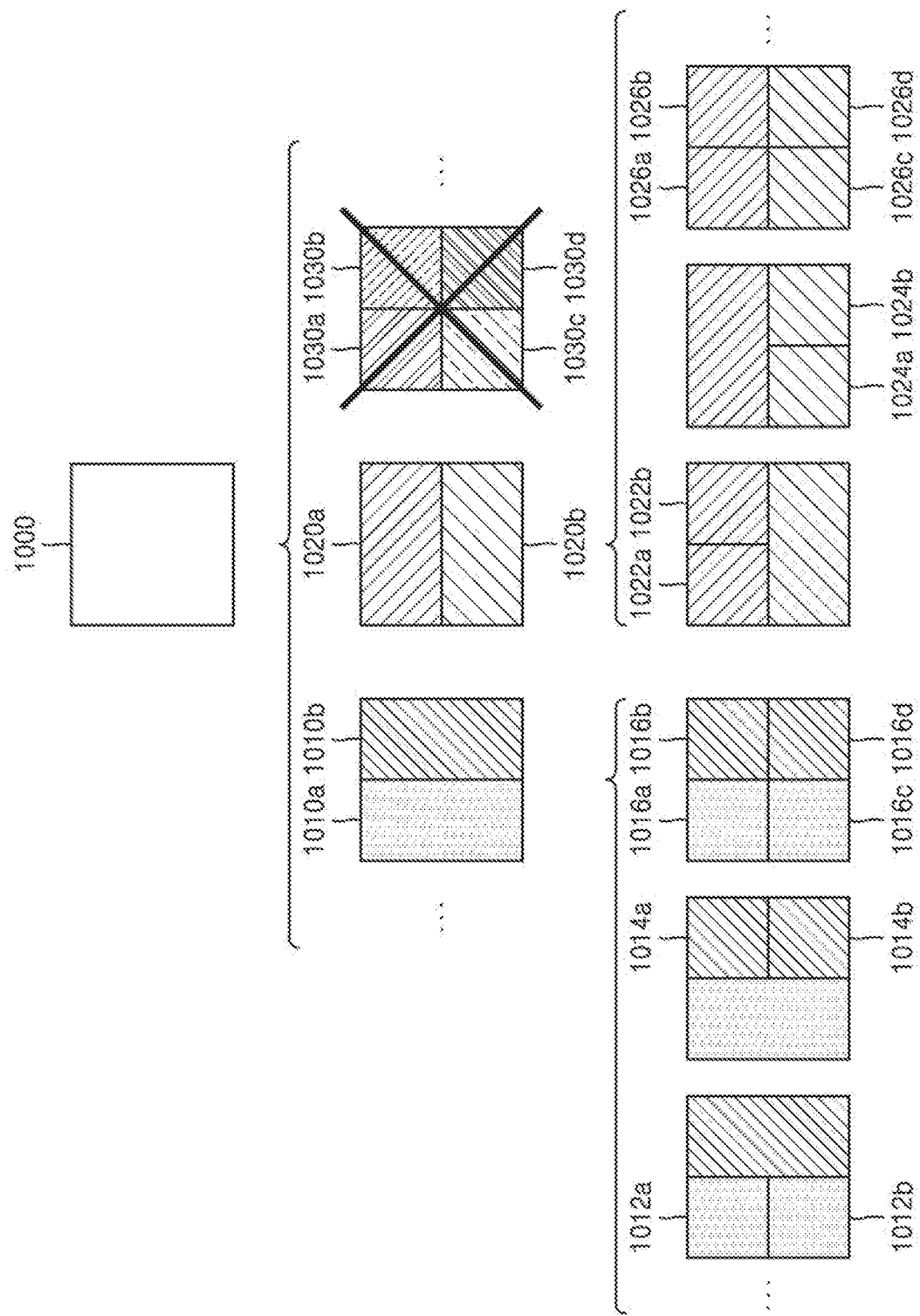
FIG. 10 illustrates a process of splitting a coding unit having a square shape when split shape information does not indicate splitting of the coding unit into four coding units having square shapes, according to an exemplary embodiment.

FIG. 10 illustrates a process of splitting, by the image decoding apparatus 150, a coding unit having a square shape when split shape information does not indicate splitting of the coding unit into four coding units having square shapes, according to an exemplary embodiment.

According to the present exemplary embodiment, the image decoding apparatus 150 may determine second coding units 1010a, 1010b, 1020a, 1020b, and so on by splitting a first coding unit 1000 based on at least one of block shape information and split shape information. The split shape information may include information about various shapes into which a coding unit is able to be split, but sometimes, the information about various shapes may not include information for splitting a coding unit into four square coding units. According to such split shape information, the image decoding apparatus 150 is unable to split the first coding unit 1000 having a square shape into four square second coding units 1030a, 1030b, 1030c, and 1030d. Based on the split shape information, the image decoding apparatus 150 may determine the second coding units 1010a, 1010b, 1020a, 1020b, and so on having non-square shapes.

According to the present exemplary embodiment, the image decoding apparatus 150 may independently split the second coding units 1010a, 1010b, 1020a, 1020b, and so on having non-square shapes. Each of the second coding units 1010a, 1010b, 1020a, 1020b, and so on may be split in a predetermined order through a recursive method that may correspond to a method of splitting the first coding unit 1000 based on at least one of block shape information and split shape information.

For example, the image decoding apparatus 150 may determine third coding units 1012a and 1012b having square shapes by splitting the left second coding unit 1010a in a horizontal direction and may determine third coding units 1014a and 1014b having square shapes by splitting the right second coding unit 1010b in a horizontal direction. In addition, the image decoding apparatus 150 may determine third coding units 1016a, 1016b, 1016c, and 1016d having square shapes by splitting both the left second coding unit 1010a and the right second coding unit 1010b in the horizontal direction. In this case, coding units may be determined in the same manner in which the first coding unit 1000 is split into the four square second coding units 1030a, 1030b, 1030c, and 1030d.

As another example, the image decoding apparatus 150 may determine third coding units 1022a and 1022b having square shapes by splitting the top second coding unit 1020a in the vertical direction and determine third coding units 1024a and 1024b having square shapes by splitting the bottom second coding unit 1020b in the vertical direction. In addition, the image decoding apparatus 150 may determine third coding units 1022a, 1022b, 1024a, and 1024b having square shapes by splitting both the top second coding unit 1020a and the bottom second coding unit 1020b in the vertical direction. In this case, coding units may be determined in the same manner in which the first coding unit 1000 is split into the four square second coding units 1030a, 1030b, 1030c, and 1030d.

Figure 11:
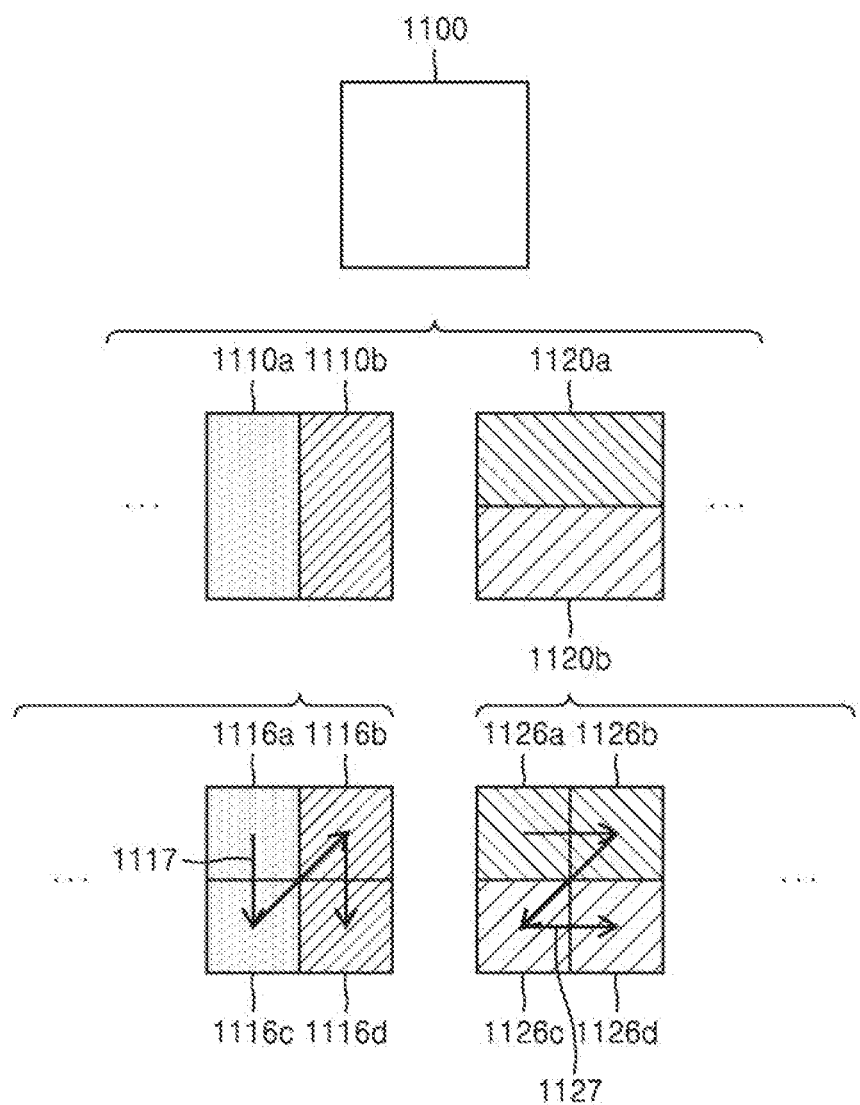
FIG. 11 illustrates that a processing order between a plurality of coding units may be changed according to a split process of a coding unit, according to an exemplary embodiment.

FIG. 11 illustrates that a processing order between a plurality of coding units may be changed according to a split process of a coding unit, according to an exemplary embodiment.

According to the present exemplary embodiment, the image decoding apparatus 150 may split a first coding unit 1100 based on block shape information and split shape information. When the block shape information indicates a square shape and the split shape information indicates that the first coding unit 1100 is split in at least one of a horizontal direction and a vertical direction, the image decoding apparatus 150 may split the first coding unit 1100 to determine second coding units (for example, second coding units 1110a, 1110b, 1120a, 1120b, and so on). Referring to FIG. 11, the second coding units 1110a, 1110b, 1120a, and 1120b having non-square shapes and determined when the first coding unit 1100 is split only in the horizontal or vertical direction may each be independently split based on block shape information and split shape information about each of the second coding units 1110a, 1110b, 1120a, and 1120b. For example, the image decoding apparatus 150 may determine third coding units 1116a, 1116b, 1116c, and 1116d by splitting the second coding units 1110a and 1110b in the horizontal direction, wherein the second coding units 1110a and 1110b are generated when the first coding unit 1100 is split in the vertical direction, and may determine third coding units 1126a, 1126b, 1126c, and 1126d by splitting the second coding units 1120a and 1120b in the horizontal direction, wherein the second coding units 1120a and 1120b are generated when the first coding unit 1100 is split in the horizontal direction. Because split processes of the second coding units 1110a, 1110b, 1120a, and 1120b have been described above, details thereof are not provided again.

According to the present exemplary embodiment, the image decoding apparatus 150 may process coding units according to a predetermined order. Because characteristics about processing of coding units according to a predetermined order have been described above with reference to FIG. 6, details thereof are not provided again.

Referring to FIG. 11, the image decoding apparatus 150 may determine four square third coding units 1116a, 1116b, 1116c, and 1116d or 1126a, 1126b, 1126c, and 1126d by splitting the first coding unit 1100 having a square shape. According to the present exemplary embodiment, the image decoding apparatus 150 may determine a processing order of the third coding units 1116a, 1116b, 1116c, and 1116d or 1126a, 1126b, 1126c, and 1126d according to a shape of the first coding unit 1100 being split.

According to the present exemplary embodiment, the image decoding apparatus 150 may determine the third coding units 1116a, 1116b, 1116c, and 1116d by splitting each of the second coding units 1110a and 1110b in the horizontal direction, wherein the second coding units 1110a and 1110b are generated when the first coding unit 1100 is split in the vertical direction, and the image decoding apparatus 150 may process the third coding units 1116a, 1116b, 1116c, and 1116d according to an order 1117 of first processing the third coding units 1116a and 1116b included in the left second coding unit 1110a in the vertical direction and then processing the third coding units 1116c and 1116d included in the right second coding unit 1110b in the vertical direction.

According to the present exemplary embodiment, the image decoding apparatus 150 may determine the second coding units 1126a, 1126b, 1126c, and 1126d by splitting each of the second coding units 1120a and 1120b in the vertical direction, wherein the second coding units 1120a and 1120b are generated when the first coding unit 1100 is split in the horizontal direction, and the image decoding apparatus 150 may process the third coding units 1126a, 1126b, 1126c, and 1126d according to an order 1127 of first processing the third coding units 1126a and 1126b included in the top second coding unit 1120a in the horizontal direction and then processing the third coding units 1126c and 1126d included in the bottom second coding unit 1120b in the horizontal direction.

Referring to FIG. 11, the third coding units 1116a, 1116b, 1116c, 1116d, 1126a, 1126b, 1126c, and 1126d having square shapes may be determined when each of the second coding units 1110a, 1110b, 1120a, and 1120b are split. The second coding units 1110a and 1110b determined when the first coding unit 1100 is split in the vertical direction and the second coding units 1120a and 1120b determined when the first coding unit 1100 is split in the horizontal direction have different shapes, but according to the third coding units 1116a, 1116b, 1116c, 1116d, 1126a, 1126b, 1126c, and 1126d determined thereafter, the first coding unit 1100 is split into coding units having the same shapes. Accordingly, even when coding units having the same shapes are determined as a result by recursively splitting coding units through different processes based on at least one of block shape information and split shape information, the image decoding apparatus 150 may process the coding units having the same shapes in different orders.

FIG. 12 illustrates a process of determining a depth of a coding unit when a shape and size of the coding unit changes, when a plurality of coding units are determined when the coding unit is recursively split, according to an exemplary embodiment.

According to the present exemplary embodiment, the image decoding apparatus 150 may determine a depth of a coding unit according to predetermined criterion. For example, the predetermined criterion may be a length of a longer side of the coding unit. When a length of a longer side of a coding unit before being split is 2n times a length of a longer side of a current coding unit, wherein n>0, the image decoding apparatus 150 may determine that a depth of the current coding unit is higher than a depth of the coding unit before being split by n. Hereinafter, a coding unit having a higher depth will be referred to as a coding unit of a lower depth.

Referring to FIG. 12, according to the present exemplary embodiment, the image decoding apparatus 150 may determine a second coding unit 1202 and a third coding unit 1204 of lower depths by splitting a first coding unit 1200 having a square shape, based on block shape information indicating a square shape (for example, block shape information may indicate '0: SQUARE'). When a size of the first coding unit 1200 having a square shape is 2 N×2 N, the second coding unit 1202 determined by splitting a width and a height of the first coding unit 1200 by $1/2^1$ may have a size of N×N. In addition, the third coding unit 1204 determined by splitting a width and a height of the second coding unit 1202 by $1/2$ may have a size of N/2×N/2. In this case, a width and a height of the third coding unit 1204 correspond to $1/2^2$ times those of the first coding unit 1200. When a depth of the first coding unit 1200 is D, a depth of the second coding unit 1202, which is $1/2^1$ times the width and height of the first coding unit 1200, may be D+1, and a depth of the third coding unit 1204, which is $1/2^2$ times the width and height of the first coding unit 1200, may be D+2.

According to the present exemplary embodiment, the image decoding apparatus 150 may determine a second coding unit 1212 or 1222 and a third coding unit 1214 or 1224 of lower depths by splitting a first coding unit 1210 or 1220 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding apparatus 150 may determine second coding units (for example, the second coding units 1202, 1212, 1222, and so on) by splitting at least one of the width and the height of the first coding unit 1210 having a size of N×2 N. In other words, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to the present exemplary embodiment, the image decoding apparatus 150 may determine the second coding units (for example, the second coding units 1202, 1212, 1222, and so on) by splitting at least one of the width and the height of the first coding unit 1220 having a size of 2 N×N. That is, the image decoding apparatus 150 may determine the second coding unit 1202 having a size of N×N or the second coding unit 1212 having a size of N/2×N by splitting the first coding unit 1220 in the vertical direction, or may determine the second coding unit 1222 having a size of N×N/2 by splitting the first coding unit 1220 in the horizontal and vertical directions.

According to the present exemplary embodiment, the image decoding apparatus 150 may determine third coding units (for example, the third coding nits 1204, 1214, 1224, and so on) by splitting at least one of a width and a height of the second coding unit 1202 having a size of N×N. That is, the image decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to the present exemplary embodiment, the image decoding apparatus 150 may determine the third coding units (for example, the third coding units 1204, 1214, 1224, and so on) by splitting at least one of a width and a height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or determine the third coding unit 1214 having a size of N/2×N/2 by splitting the second coding unit 1212 in vertical and horizontal directions.

According to the present exemplary embodiment, the image decoding apparatus 150 may determine the third coding units (for example, the third coding units 1204, 1214, 1224, and so on) by splitting at least one of a width and a height of the second coding unit 1214 having a size of N×N/2. That is, the image decoding apparatus 150 may determine the third coding unit 1204 having a size of N/2×N/2 or the third coding unit 1214 having a size of N/2×N/2 by splitting the second coding unit 1212 in a vertical direction, or determine the third coding unit 1224 having a size of N/2×N/2 by splitting the second coding unit 1212 in vertical and horizontal directions.

According to the present exemplary embodiment, the image decoding apparatus 150 may split coding units having square shapes (for example, the first coding units 1200, 1202, and 1204) in a horizontal or vertical direction. For example, the first coding unit 1200 having a size of 2 N×2 N may be split in the vertical direction to determine the first coding unit 1210 having a size of N×2 N or in the horizontal direction to determine the first coding unit 1220 having a size of 2 N×N/. According to the present exemplary embodiment, when a depth is determined based on a length of a longest side of a coding unit, a depth of a coding unit determined when the first coding unit 1200, 1202, or 1204 is split in the horizontal or vertical direction may be the same as a depth of the first coding unit 1200, 1202, or 1204.

According to the present exemplary embodiment, the width and height of the third coding unit 1214 or 1224 may be ½ times the first coding unit 1210 or 1220. When the depth of the first coding unit 1210 or 1220 is D, the depth of the second coding unit 1212 or 1214, which is ½ times the width and height of the first coding unit 1210 or 1220, may be D+1, and the depth of the third coding unit 1214 or 1224, which is ½ times the width and height of the first coding unit 1210 or 1220, may be D+2.

Figure 13:
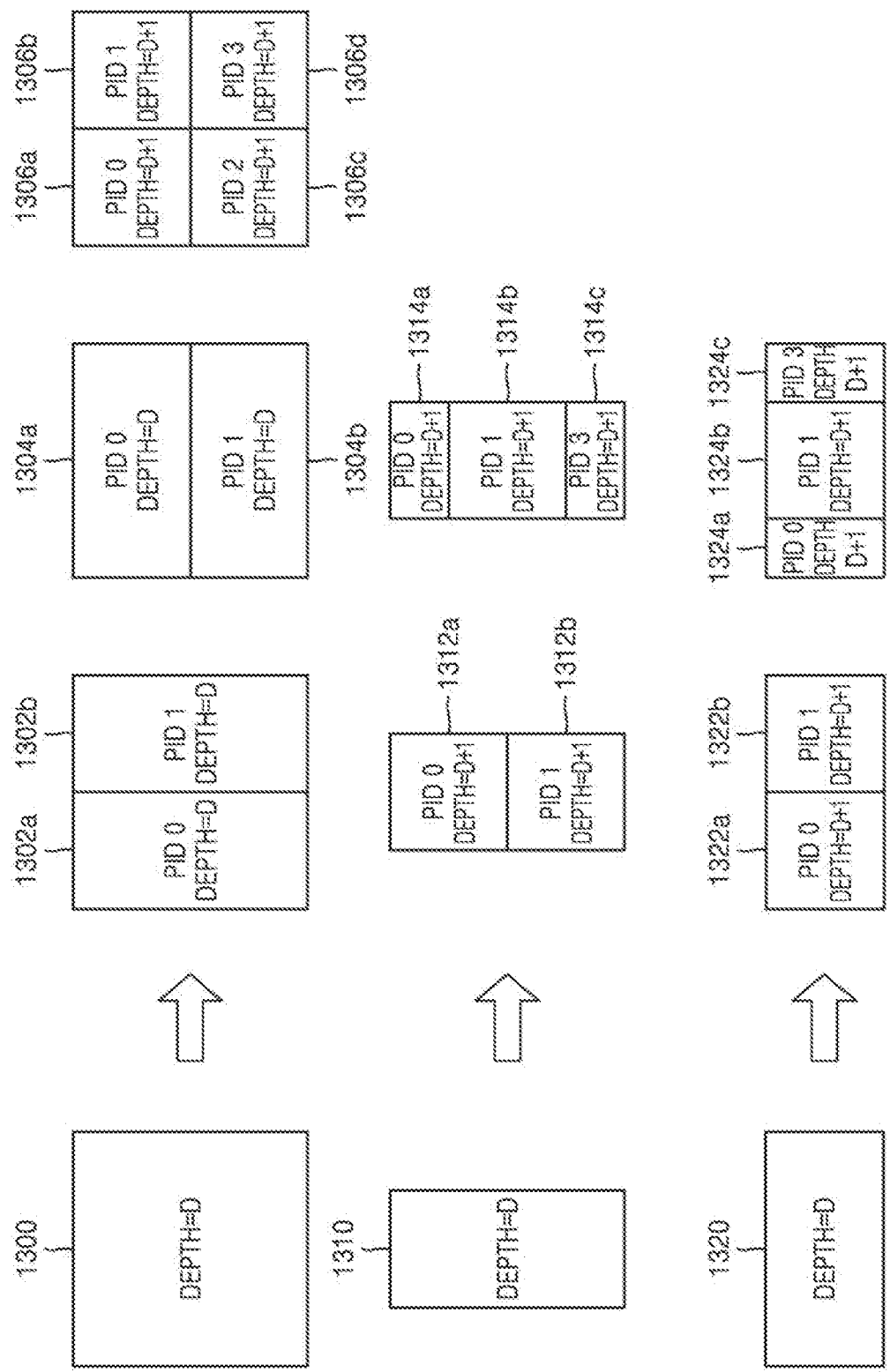
FIG. 13 illustrates a depth determinable according to shapes and sizes of coding units, and a part index (PID) for distinguishing between the coding units, according to an exemplary embodiment.

FIG. 13 illustrates a depth determinable according to shapes and sizes of coding units, and a part index (PID) for distinguishing between the coding units, according to an exemplary embodiment.

According to the present exemplary embodiment, the image decoding apparatus 150 may determine second coding units having various shapes by splitting a first coding unit 1300 having a square shape. Referring to FIG. 13, the image decoding apparatus 150 may determine second coding units 1302*a*, 1302*b*, 1304*a*, 1304*b*, 1306*a*, 1306*b*, 1306*c*, and 1306*d* by splitting the first coding unit 1300 in at least one of a vertical direction and a horizontal direction, according to split shape information. That is, the image decoding apparatus 150 may determine the second coding units 1302*a*, 1302*b*, 1304*a*, 1304*b*, 1306*a*, 1306*b*, 1306*c*, and 1306*d* based on split shape information about the first coding unit 1300.

According to the present exemplary embodiment, depths of the second coding units 1302*a*, 1302*b*, 1304*a*, 1304*b*, 1306*a*, 1306*b*, 1306*c*, and 1306*d* determined according to the split shape information about the first coding unit 1300 having a square shape may be determined based on lengths of longer sides. For example, because lengths of longer sides of the second coding units 1302*a*, 1302*b*, 1304*a*, and 1304*b* having non-square shapes are the same as a length of one side of the first coding unit 1300 having a square shape, depths of the first coding unit 1300 and the second coding units 1302*a*, 1302*b*, 1304*a*, and 1304*b* having non-square shapes may be D, i.e., the same. On the other hand, when the image decoding apparatus 150 splits the first coding unit 1300 into the four second coding units 1306*a*, 1306*b*, 1306*c*, and 1306*d* having square shapes based on split shape information, because a length of one side of each of the second coding units 1306*a*, 1306*b*, 1306*c*, and 1306*d* having square shapes is ½ of a length of one side of the first coding unit 1300, depths of the second coding units 1306*a*, 1306*b*, 1306*c*, and 1306*d* may be D+1, i.e., one depth lower than the depth D of the first coding unit 1300.

According to the present exemplary embodiment, the image decoding apparatus 150 may split a first coding unit 1310 having a height longer than a width into a plurality of second coding units 1312*a*, 1312*b*, 1314*a*, 1314*b*, and 1314*c* by splitting the first coding unit 1310 in a horizontal direction according to split shape information. According to the present exemplary embodiment, the image decoding apparatus 150 may split a first coding unit 1320 having a width longer than a height into a plurality of second coding units 1322*a* and 1322*b*, or 1324*a*, 1324*b*, and 1324*c* by splitting the first coding unit 1320 in a vertical direction according to split shape information.

According to the present exemplary embodiment, depths of the second coding units 1312*a*, 1312*b*, 1314*a*, 1314*b*, 1314*c*, 1322*a*, 1322*b*, 1324*a*, 1324*b*, and 1324*c* determined according to the split shape information about the first coding unit 1310 or 1320 having a non-square shape may be determined based on lengths of longer sides. For example, because a length of one side of each of the second coding units 1312*a* and 1312*b* having square shapes is ½ of a length of one side of the first coding unit 1310 having a non-square shape in which a height is longer than a width, the depths of the second coding units 1302*a*, 1302*b*, 1304*a*, and 1304*b* having square shapes are D+1, i.e., one depth lower than the depth D of the first coding unit 1310 having a non-square shape.

In addition, the image decoding apparatus 150 may split the first coding unit 1310 having a non-square shape into an odd number of the second coding units 1314*a*, 1314*b*, and 1314*c* based on split shape information. The odd number of second coding units 1314*a*, 1314*b*, and 1314*c* may include the second coding units 1314*a* and 1314*c* having non-square shapes and the second coding unit 1314*b* having a square shape. Here, because lengths of longer sides of the second coding units 1314*a* and 1314*c* having non-square shapes and a length of one side of the second coding unit 1314*b* having a square shape are ½ of a length of one side of the first coding unit 1310, depths of the second coding units 1314*a*, 1314*b*, and 1314*c* may be D+1, i.e., one depth lower than the depth D of the first coding unit 1310. The image decoding apparatus 150 may determine depths of coding units related to the first coding unit 1320 having a non-square shape in which a width is longer than a height in the similar manner as depths of coding units related to the first coding unit 1310 are determined.

According to the present exemplary embodiment, while determining PIDs for distinguishing between coding units, the image decoding apparatus 150 may determine the PIDs based on size ratios between the coding units when an odd number of the coding units do not have the same size. Referring to FIG. 13, the coding unit 1314*b* located at the center of the odd number of coding units 1314*a* through 1314*c* has the same width as the coding units 1314*a* and 1314*c*, but has a height twice higher than heights of the coding units 1314*a* and 1314*c*. In this case, the coding unit 1314*b* located at the center may include two of each of the coding units 1314*a* and 1314*c*. Accordingly, when a PID of the coding unit 1314*b* located at the center according to a scan order is 1, a PID of the coding unit 1314*c* located in a next order may be increased by 2, i.e., 3. That is, values of PIDs may be discontinuous. According to the present exemplary embodiment, the image decoding apparatus 150 may determine whether an odd number of coding units have the same size based on discontinuity of PIDs for distinguishing between the coding units.

According to the present exemplary embodiment, the image decoding apparatus 150 may determine whether a plurality of coding units determined when a current coding unit is split have certain split shapes based on values of PIDs for distinguishing between the coding units. Referring to FIG. 13, the image decoding apparatus 150 may determine an even number of the coding units 1312*a* and 1312*b* or an odd number of the coding units 1314*a* through 1314*c* by splitting the first coding unit 1310 having a rectangular shape in which a height is longer than a width. The image decoding apparatus 150 may use a ID indicating each coding unit in order to distinguish between a plurality of coding units. According to the present exemplary embodiment, the PID may be obtained from a sample at a predetermined location (for example, an upper left sample) of each coding unit.

According to the present exemplary embodiment, the image decoding apparatus 150 may determine a coding unit at a predetermined location from among coding units determined via split, by using PIDs for distinguishing between the coding units. According to an exemplary embodiment, when split shape information about the first coding unit 1310 having a rectangular shape in which a height is longer than a width indicates split into three coding units, the image decoding apparatus 150 may split the first coding unit 1310 into the three coding units 1314*a*, 1314*b*, and 1314*c*. The image decoding apparatus 150 may allocate a PID to each of the three coding units 1314*a*, 1314*b*, and 1314*c*. The image decoding apparatus 150 may compare PIDs of coding units to determine a center coding unit from among an odd number of coding units. The image decoding apparatus 150 may determine the coding unit 1314*b* having a PID corresponding to a center value from among PIDs as a coding unit located at the center from among coding units determined when the first coding unit 1310 is split, based on PIDs of the coding units. According to the present exemplary embodiment, the image decoding apparatus 150 may determine PIDs based on size ratios between coding units when the coding units do not have the same size, while determining the PIDs for distinguishing between the coding units. Referring to FIG. 13, the coding unit 1314*b* generated when the first coding unit 1310 is split may have the same width as the coding units 1314*a* and 1314*c*, but may have a height twice greater than heights of the coding units 1314*a* and 1314*c*. In this case, when the PID of the coding unit 1314*b* located at the center is 1, the PID of the coding unit 1314*c* located in a next order may be increased by 2, i.e., 3. As such, when an increase range changes while PIDs are uniformly increasing, the image decoding apparatus 150 may determine that a coding unit is split into a plurality of coding units including a coding unit having a different size from other coding units. According to the present exemplary embodiment, when split shape information indicates split into an odd number of coding units, the image decoding apparatus 150 may split a current coding unit into an odd number of coding units in which a coding unit at a predetermined location (for example, a center coding unit) has a different size from other coding units. In this case, the image decoding apparatus 150 may determine the center coding unit having the different size by using PIDs of the coding units. However, because the PID, and a size or location of a coding unit at a predetermined location are specified to describe the present exemplary embodiment, and thus the present disclosure is not limited thereto, and various PIDs, and various locations and sizes of a coding unit may be used.

According to the present exemplary embodiment, the image decoding apparatus 150 may use a predetermined data unit from which a coding unit starts to be recursively split.

Figure 14:
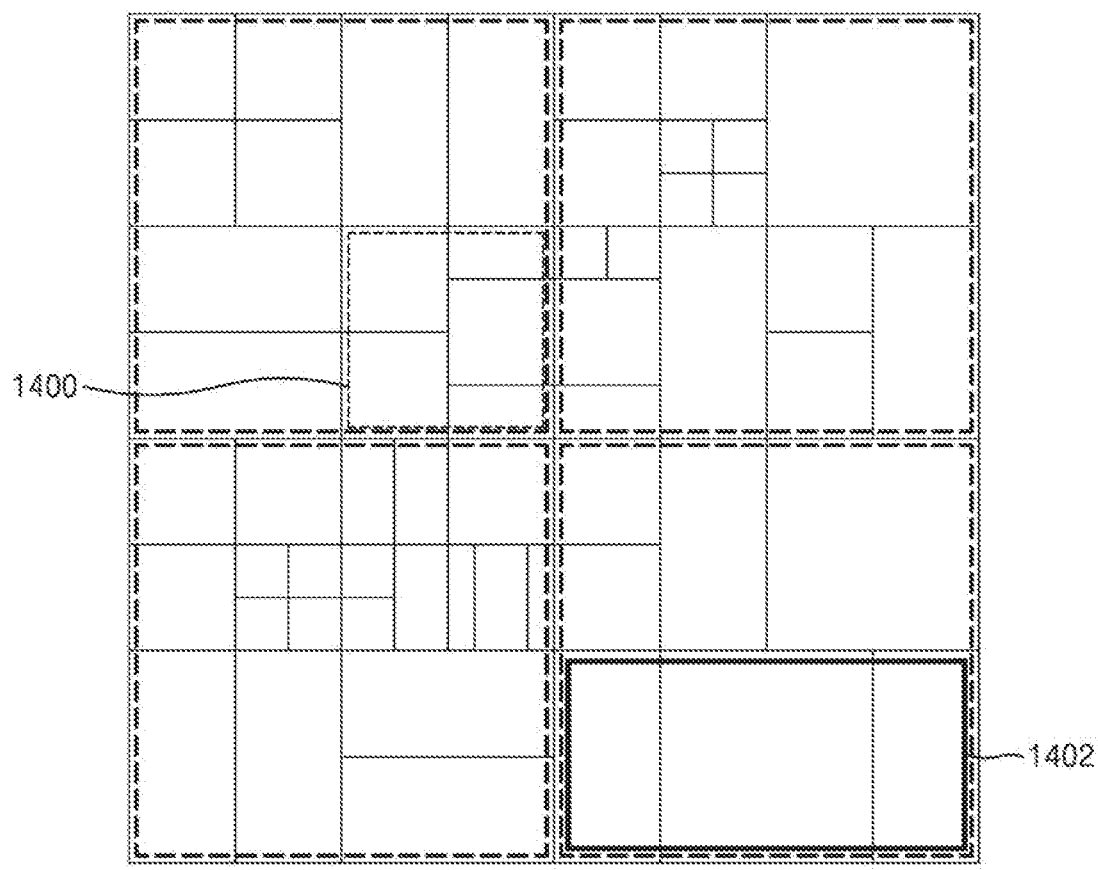
FIG. 14 illustrates that a plurality of coding units are determined according to a plurality of predetermined data units included in a picture, according to an exemplary embodiment.

FIG. 14 illustrates that a plurality of coding units are determined according to a plurality of predetermined data units included in a picture, according to an exemplary embodiment.

According to the present exemplary embodiment, a predetermined data unit may be defined as a data unit from which a coding unit starts to be recursively split by using at least one of block shape information and split shape information. That is, the predetermined data unit may correspond to a coding unit of an uppermost depth used while determining a plurality of coding units splitting a current picture. Hereinafter, for convenience of description, such a predetermined data unit is referred to as a reference data unit.

According to the present exemplary embodiment, a reference data unit may indicate a predetermined size and shape. According to an exemplary embodiment, a reference coding unit may include M×N samples. Here, M and N may be equal to each other, and may be an integer expressed as a multiple of 2. That is, a reference data unit may indicate a square shape or a non-square shape, and may later be split into an integer number of coding units.

According to the present exemplary embodiment, the image decoding apparatus 150 may split a current picture into a plurality of reference data units. According to the present exemplary embodiment, the image decoding apparatus 150 may split the plurality of reference data units obtained by splitting the current picture by using split information about each of the reference data units. Split processes of such reference data units may correspond to split processes using a quad-tree structure.

According to the present exemplary embodiment, the image decoding apparatus 150 may pre-determine a smallest size available for the reference data unit included in the current picture. Accordingly, the image decoding apparatus 150 may determine the reference data unit having various sizes that are equal to or larger than the smallest size, and determine at least one coding unit based on the determined reference data unit by using block shape information and split shape information.

Referring to FIG. 14, the image decoding apparatus 150 may use a reference coding unit 1400 having a square shape, or may use a reference coding unit 1402 having a non-square shape. According to the present exemplary embodiment, a shape and size of a reference coding unit may be determined according to various data units (for example, a sequence, a picture, a slice, a slice segment, and a largest coding unit) that may include at least one reference coding unit.

According to the present exemplary embodiment, the receiver 160 of the image decoding apparatus 150 may obtain, from a bitstream, at least one of information about a shape of a reference coding unit and information about a size of the reference coding unit, according to the various data units. Processes of determining at least one coding unit included in the reference coding unit 1400 having a square shape have been described above through processes of splitting the current coding unit 1000 of FIG. 10, and processes of determining at least one coding unit included in the reference coding unit having a non-square shape have been described above through processes of splitting the current coding unit 1100 or 1150 of FIG. 11, and thus descriptions thereof are not provided here.

According to the present exemplary embodiment, in order to determine a size and shape of a reference coding unit according to some data units pre-determined based on a predetermined condition, the image decoding apparatus 150 may use a PID for checking the size and shape of the reference coding unit. That is, the receiver 160 may obtain, from a bitstream, only a PID for checking a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 150 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding apparatus 150 may select at least one of the pre-determined size and shape of the reference coding unit according to the PID to determine at least one of the size and shape of the reference coding unit included in a data unit that is a criterion for obtaining the PID.

According to the present exemplary embodiment, the image decoding apparatus 150 may use at least one reference coding unit included in one largest coding unit. That is, a largest coding unit splitting an image may include at least one reference coding unit, and a coding unit may be determined when each of the reference coding unit is recursively split. According to the present exemplary embodiment, at least one of a width and height of the largest coding unit may be an integer times at least one of a width and height of the reference coding unit. According to the present exemplary embodiment, a size of a reference coding unit may be equal to a size of a largest coding unit, which is split n times according to a quad-tree structure. That is, the image decoding apparatus 150 may determine a reference coding unit by splitting a largest coding unit n times according to a quad-tree structure, and split the reference coding unit based on at least one of block shape information and split shape information according to various embodiments.

Figure 15:
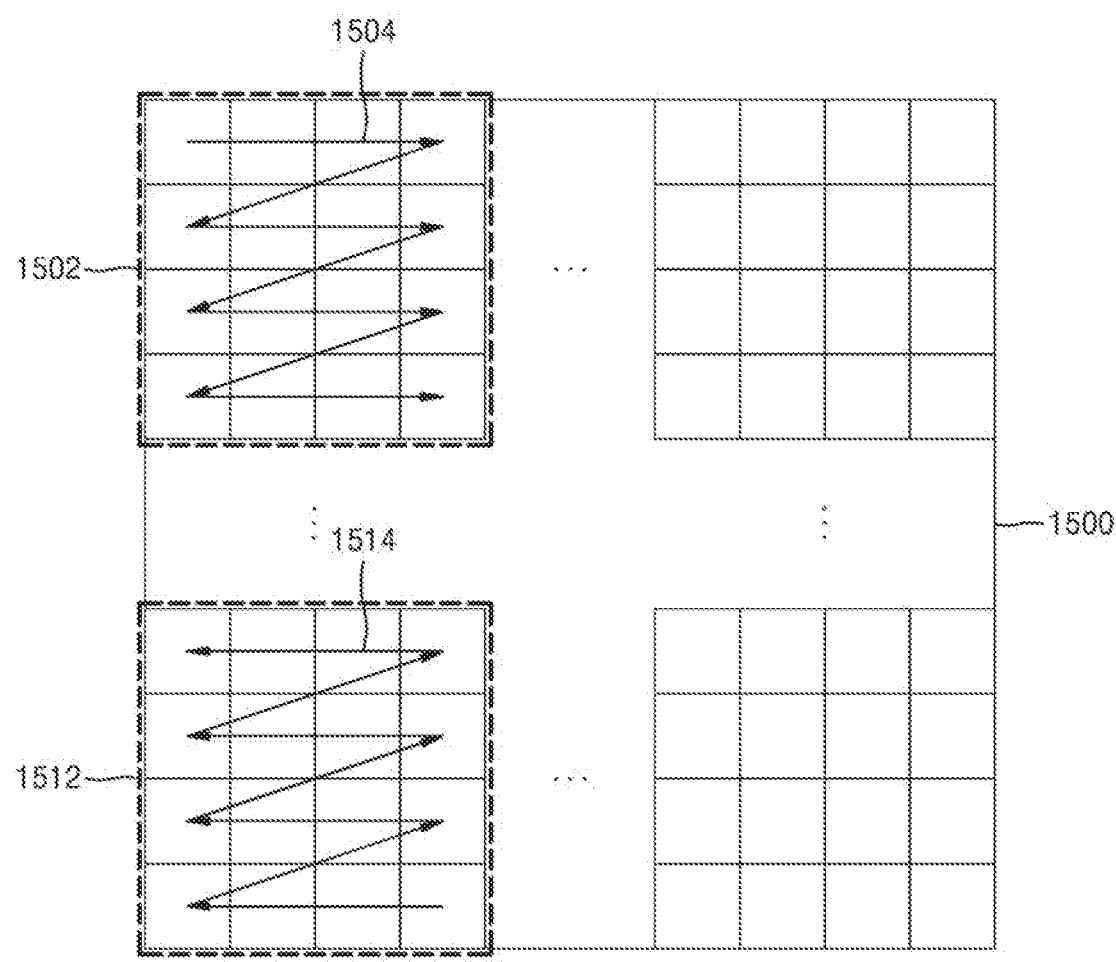
FIG. 15 illustrates a processing block that is a criterion in determining a order of a reference coding unit included in a picture, according to an exemplary embodiment.

FIG. 15 illustrates a processing block that is a criterion in determining a order of a reference coding unit included in a picture 1500, according to an exemplary embodiment.

According to the present exemplary embodiment, the image decoding apparatus 150 may determine at least one processing block splitting a picture. A processing block is a data unit including at least one reference coding unit splitting an image, and the at least one reference coding unit included in the processing block may be determined in a certain order. That is, a order of the at least one reference coding unit determined in each processing block may correspond to one of various orders for determining a reference coding unit, and may vary according to processing blocks. A order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to the present exemplary embodiment, the image decoding apparatus 150 may determine a size of at least one processing block included in an image by obtaining information about a size of a processing block. The image decoding apparatus 150 may obtain, from a bitstream, the information about a size of a processing block to determine the size of the at least one processing block included in the image. The size of the processing block may be a predetermined size of a data unit indicated by the information about a size of a processing block.

According to the present exemplary embodiment, the receiver 160 of the image decoding apparatus 150 may obtain, from the bitstream, the information about a size of a processing block according to certain data units. For example, the information about a size of a processing block may be obtained from the bitstream in data units of images, sequences, pictures, slices, and slice segments. That is, the receiver 160 may obtain, from the bitstream, the information about a size of a processing block according to such several data units, and the image decoding apparatus 150 may determine the size of at least one processing block splitting the picture by using the obtained information about a size of a processing block, wherein the size of the processing block may be an integer times a size of a reference coding unit.

According to the present exemplary embodiment, the image decoding apparatus 150 may determine sizes of processing blocks 1502 and 1512 included in the picture 1500. For example, the image decoding apparatus 150 may determine a size of a processing block based on information about a size of a processing block, the information obtained from a bitstream. Referring to FIG. 15, the image decoding apparatus 150 may determine horizontal sizes of the processing blocks 1502 and 1512 to be four times a horizontal size of a reference coding unit, and a vertical size thereof to be four times a vertical size of the reference coding unit, according to an exemplary embodiment. The image decoding apparatus 150 may determine a order of at least one reference coding unit in at least one processing block.

According to the present exemplary embodiment, the image decoding apparatus 150 may determine each of the processing blocks 1502 and 1512 included in the picture 1500 based on a size of a processing block, and may determine a order of at least one reference coding unit included in each of the processing blocks 1502 and 1512. According to the present exemplary embodiment, determining of a reference coding unit may include determining of a size of the reference coding unit.

According to the present exemplary embodiment, the image decoding apparatus 150 may obtain, from a bitstream, information about a order of at least one reference coding unit included in at least one processing block, and may determine the order of the at least one reference coding unit based on the obtained information. The information about a order may be defined as an order or direction of determining reference coding units in a processing block. That is, an order of determining reference coding units may be independently determined per processing block.

According to the present exemplary embodiment, the image decoding apparatus 150 may obtain, from a bitstream, information about a order of a reference coding unit according to certain data units. For example, the receiver 160 may obtain, from the bitstream, the information about a order of a reference coding unit according to data units, such as images, sequences, pictures, slices, slice segments, and processing blocks. Because the information about a order of a reference coding unit indicates a order of a reference coding unit in a processing block, the information about a order may be obtained per certain data unit including an integer number of processing blocks.

According to the present exemplary embodiment, the image decoding apparatus 150 may determine at least one reference coding unit based on the determined order.

According to the present exemplary embodiment, the receiver 160 may obtain, from the bitstream, information about a order of a reference coding unit, as information related to the processing blocks 1502 and 1512, and the image decoding apparatus 150 may determine an order of determining at least one reference coding unit included in the processing blocks 1502 and 1512 and determine at least one reference coding unit included in the picture 1500 according to a order of a coding unit. Referring to FIG. 15, the image decoding apparatus 150 may determine orders 1504 and 1514 of at least one reference coding unit respectively related to the processing blocks 1502 and 1512. For example, when information about a order of a reference coding unit is obtained per processing block, orders of a reference coding unit related to the processing blocks 1502 and 1512 may be different from each other. When the order 1504 related to the processing block 1502 is a raster scan order, reference coding units included in the processing block 1502 may be determined according to the raster scan order. On the other hand, when the order 1514 related to the processing block 1512 is an inverse order of a raster scan order, reference coding units included in the processing block 1512 may be determined in the inverse order of the raster scan order.

With reference to FIGS. 1 through 15, the method of splitting an image into largest coding units, and splitting each largest coding unit into coding units having a hierarchical tree structure. With reference to FIGS. 16 through 25, It will now be described how to encode or decode the encoding units of the same depth according to which encoding order.

Figure 16:
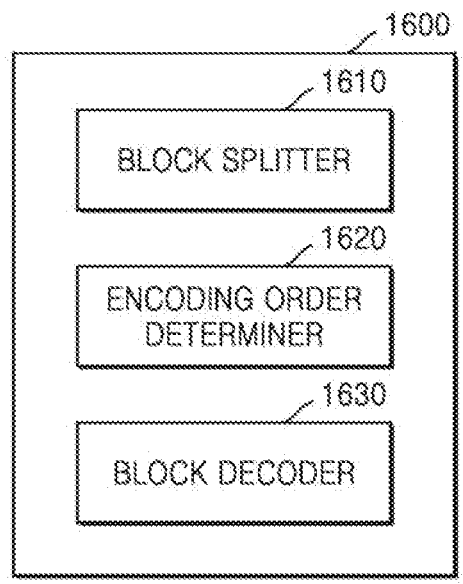
FIG. 16 illustrates a video decoding apparatus involving splitting a current block and determining an encoding order of split lower blocks, according to an exemplary embodiment.

FIG. 16 illustrates a video decoding apparatus 1600 involving splitting a current block and determining an encoding order of split lower blocks, according to an exemplary embodiment.

The video decoding apparatus 1600 includes a block splitter 1610, an encoding order determiner 1620, and a block decoder 1630. Referring to FIG. 16, the block splitter 1610, the encoding order determiner 1620, and the block decoder 1630 are formed as separate elements, but in an exemplary embodiment, the block splitter 1610, the encoding order determiner 1620, and the block decoder 1630 may be integrated.

Referring to FIG. 16, the block splitter 1610, the encoding order determiner 1620, and the block decoder 1630 are seen as elements located within one apparatus, but the block splitter 1610, the encoding order determiner 1620, and the block decoder 1630 are not required to incorporated into one apparatus. Thus, in an exemplary embodiment, the block splitter 1610, the encoding order determiner 1620, and the block decoder 1630 may be dispersed.

In some embodiments, the block splitter 1610, the encoding order determiner 1620, and the block decoder 1630 may be implemented by one processor. In some embodiments, the block splitter 1610, the encoding order determiner 1620, and the block decoder 1630 may be implemented by a plurality of processors.

Functions performed by the block splitter 1610, the encoding order determiner 1620, and the block decoder 1630 may be performed by the decoder 180 of FIG. 1B.

The block splitter 1610 may obtain split information indicating whether to split a current block. The split information indicates whether to split the current block into at least two smaller blocks. When the split information indicates that the current block is split, the block splitter 1610 splits the current block into at least two lower blocks.

The current block may be split into various shapes according to a shape of the current block. For example, when the current block is square-shaped, the current block may be split into four lower blocks each having a square shape.

When at least two split methods are allowable for a shape of the current block, the block splitter 1610 may select a split method according to split shape information. Thus, when the split information indicates that the current block is split, the block splitter 1610 may obtain split shape information indicating a split method with respect to the current block.

The block splitter 1610 may split the current block according to the split method indicated by the split shape information.

For example, when the current block is a square having a size of 2 N×2 N, the split shape information may indicate a split method from among an N×N split, a 2 N×N split, an N×2 N split, a vertically non-uniform three-split, and a horizontally non-uniform three-split, the split method being applied to the current block. The N×N split involves splitting the current block into four blocks each having a size of N×N. The 2 N×N split involves splitting the current block into blocks each having a size of 2 N×N. The N×2 N split involves splitting the current block into blocks each having a size of N×2 N. The vertically non-uniform three-split involves splitting a block having a size of 2 N×2 N into three blocks having an equal width and of which ratio of heights is 1:2:1. The horizontally non-uniform three-split involves splitting a block having a size of 2 N×2 N into three blocks having an equal height and of which ratio of widths is 1:2:1. In addition to these splits, the current block may be split according to one of various horizontal split methods and vertical split methods.

When the current block is a vertically-long rectangle having a size of 2 N×N, the split shape information may indicate a split method from among an N×N split and a vertically non-uniform three-split, the split method being applied to the current block. The N×N split involves splitting the current block into two blocks each having a size of N×N. The vertically non-uniform three-split involves splitting a block having a size of 2 N×N into three blocks having an equal width and of which ratio of heights is 1:2:1. In addition to these splits, the current block may be split according to one of various horizontal split methods and vertical split methods.

When the current block is a horizontally-long rectangle having a size of N×2 N, the split shape information may indicate a split method from among an N×N split and a horizontally non-uniform three-split, the split method being applied to the current block. The N×N split involves splitting the current block into two blocks each having a size of N×N. The horizontally non-uniform three-split involves splitting a block having a size of N×2 N into three blocks having an equal height and of which ratio of widths is 1:2:1 or other ratios. In addition to these splits, the current block may be split according to one of various horizontal split methods and vertical split methods.

In addition to the aforementioned splits, a method of splitting a current block according to an asymmetrical ratio, a method of splitting a current block into triangular blocks, a method of splitting a current block into geometric blocks, or the like may be used to split a current block having a square shape or a rectangular shape.

When the split information indicates that the current block is not split, the block splitter 1610 does not split the current block. Then, the block decoder 1630 decodes the current block.

When the current block is a coding unit, the block splitter 1610 determines the current block to be a final coding unit. The final coding unit is no longer split to coding units having a higher depth. According to the present exemplary embodiment, when the current block that is the final coding unit is split into data units that are not the coding unit, the block decoder 1630 may allow the block splitter 1610 to split the current block.

According to the present exemplary embodiment, the block splitter 1610 may split the current block into one or more prediction units according to a hierarchical tree structure. Equally, the block splitter 1610 may split the current block into one or more transform units according to a hierarchical tree structure. The block decoder 1630 may reconstruct the current block according to a prediction result with respect to one or more prediction units and a transformation result with respect to one or more transform units.

When the current block is a prediction unit, the block decoder 1630 may perform prediction on the current block. When the current block is a transform unit, the block decoder 1630 may inverse-quantize and inverse-transform a quantized transform coefficient with respect to the current block, thereby obtaining residual data.

The encoding order determiner 1620 obtains encoding order information indicating an encoding order of lower blocks. The, the encoding order determiner 1620 may determine the encoding order of lower blocks according to the obtained encoding order information.

The encoding order information indicates the encoding order of two or more lower blocks included in the current block. A data amount of the encoding order information is determined according to the number of lower blocks and a method of determining the encoding order.

For example, when two lower blocks are present, the encoding order information may be determined to indicate a lower block that is previously encoded from among the two lower blocks. Thus, the encoding order information may be a flag having a data amount of 1 bit.

However, when four lower blocks are present, number of cases of an encoding order of the lower blocks is 4!=24. Thus, in order to indicate twenty-four encoding orders, a data amount of 5 bits is required. That is, when the number of lower blocks is increased, number of cases of an encoding order is also increased. Therefore, in order to decrease a data amount of the encoding order information, an encoding order determination technique may be used in a manner that an encoding order is determined by determining whether an encoding order of some lower block pairs is swapped in a predetermined default encoding order. Encoding order information indicating whether an encoding order of lower block pairs is swapped indicates a forward direction or an inverse direction with respect to a default encoding order.

Figure 18A:
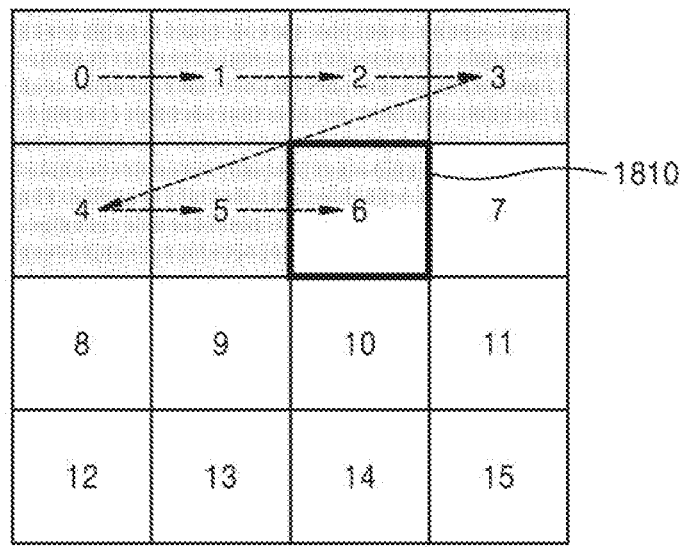
FIGS. 18A, 18B, and 18C illustrate a default encoding order according to an exemplary embodiment.
Figure 18B:
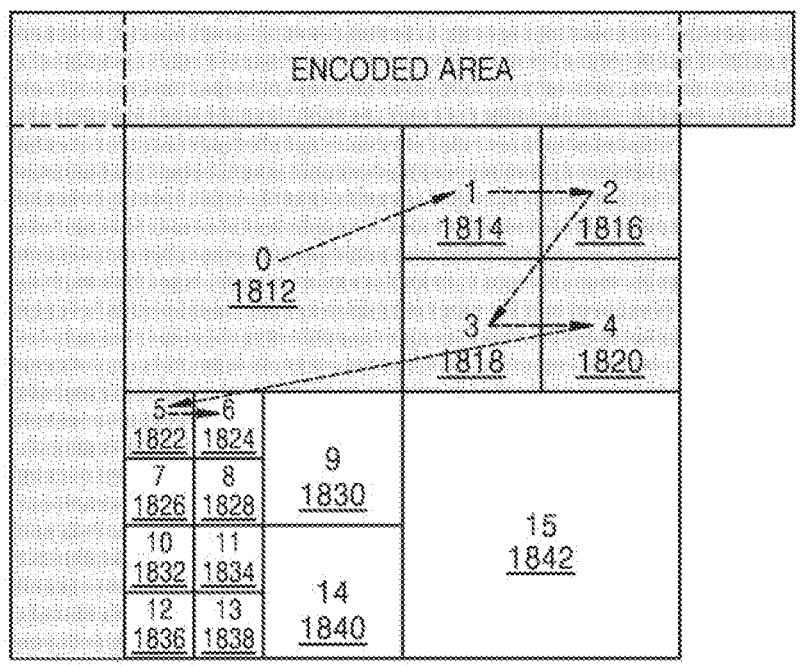
Figure 18C:
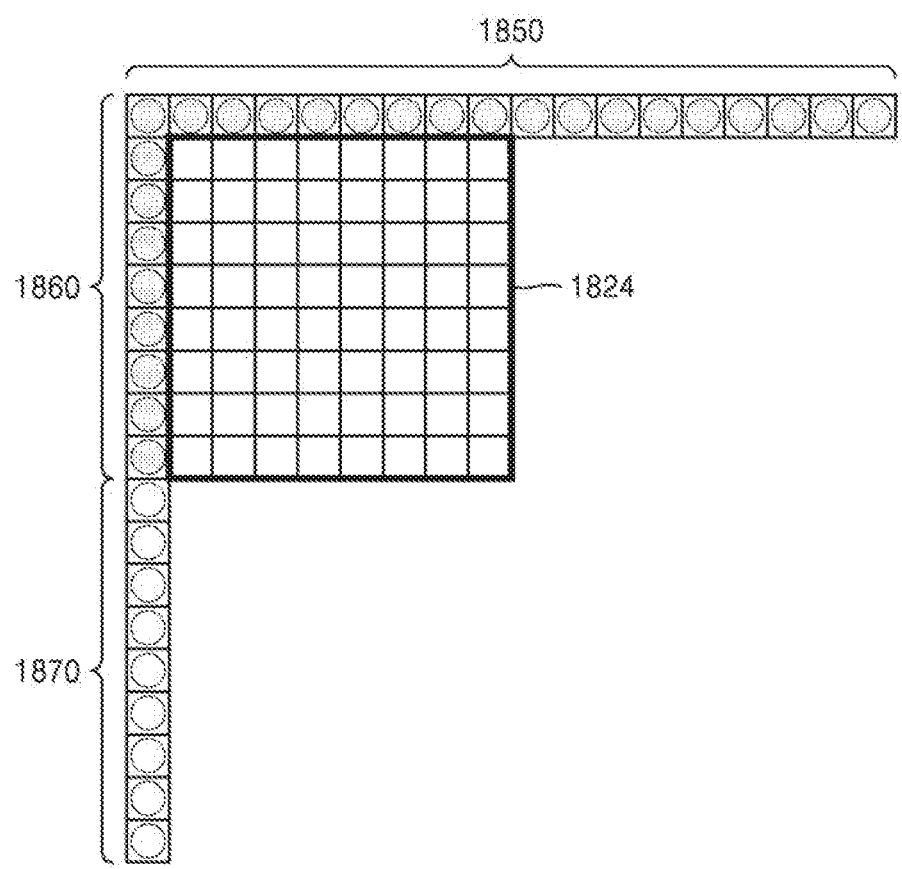

A current picture including the current block is encoded and decoded according to a default encoding order. All blocks and pixels that are encoded and decoded in the current picture are encoded and decoded in an equal level according to the default encoding order. Thus, lower blocks in the equal level which are split from the current block are also encoded and decoded according to the default encoding order. An exemplary embodiment of the default encoding order is illustrated in FIGS. 18A through 18C to be described below.

Thus, when a lower block pair is encoded according to the default encoding order, the lower block pair is encoded in a forward direction. On the contrary, when the lower block pair is encoded opposite to the default encoding order, the lower block pair is encoded in an inverse direction For example, in a case where two lower blocks are neighboring in a horizontal direction and are encoded in a forward direction, encoding order information may be determined in such a manner that a left lower block is to be first decoded. On the other hand, the two lower blocks that are neighboring in the horizontal direction are encoded in an inverse direction, the encoding order information may be determined in such a manner that a right lower block is to be first decoded.

Equally, in a case that two lower blocks are neighboring in a vertical direction and are encoded in a forward direction, encoding order information may be determined in such a manner that a top lower block is to be first decoded. On the other hand, the two lower blocks that are neighboring in the vertical direction are encoded in an inverse direction, the encoding order information may be determined in such a manner that a bottom lower block is to be first decoded.

When encoding order information only indicates an encoding order of a lower block pair, the encoding order information has a data amount of 1 bit. The encoding order information having the data amount of 1 bit may be defined as an encoding order flag.

Figure 20:
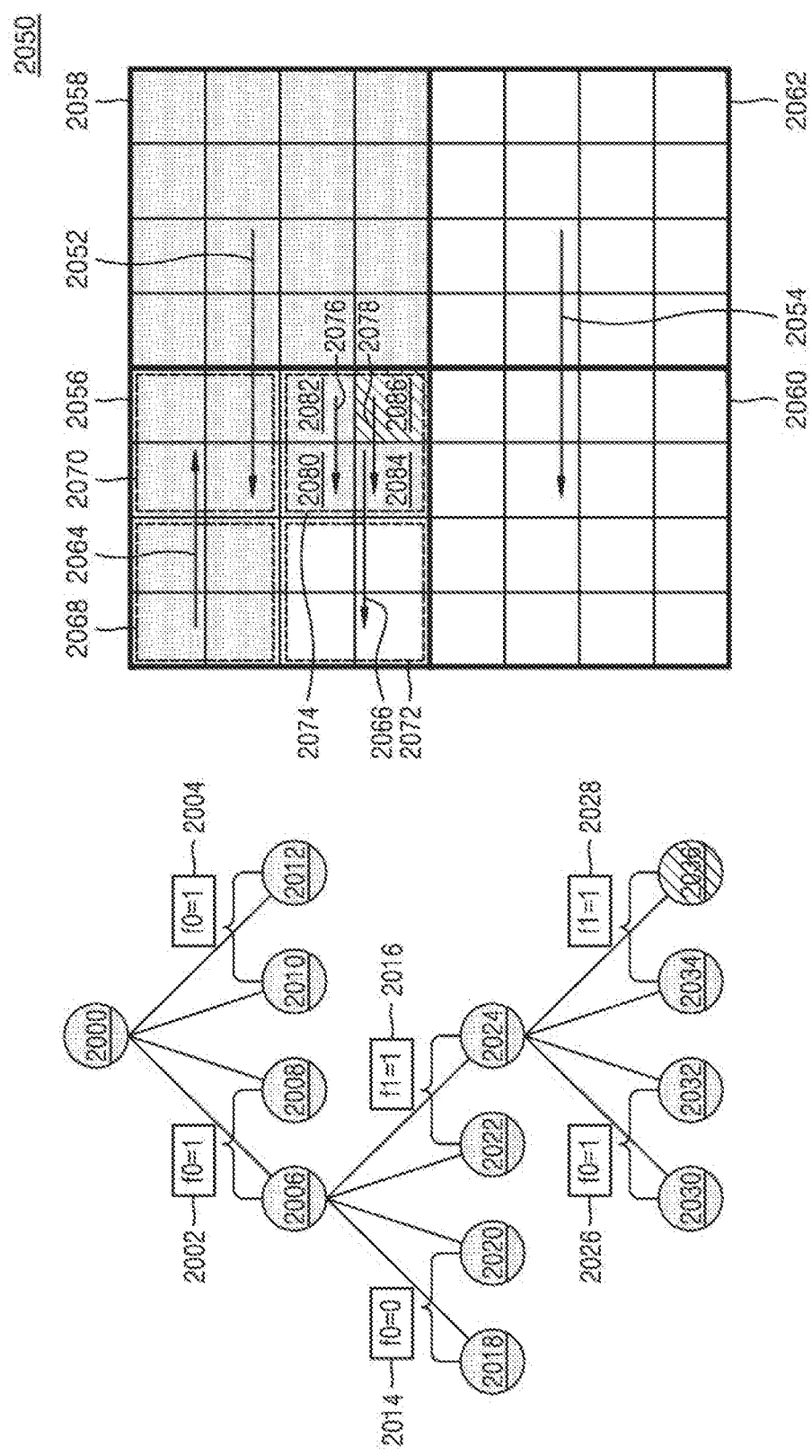
FIG. 20 illustrates a tree structure of a largest coding unit, which is for describing an encoding order of the largest coding unit and coding units included in the largest coding unit.

With reference to FIG. 20, it will be described how the encoding order flag functions when a square current block is split into four lower blocks.

Figure 21A:
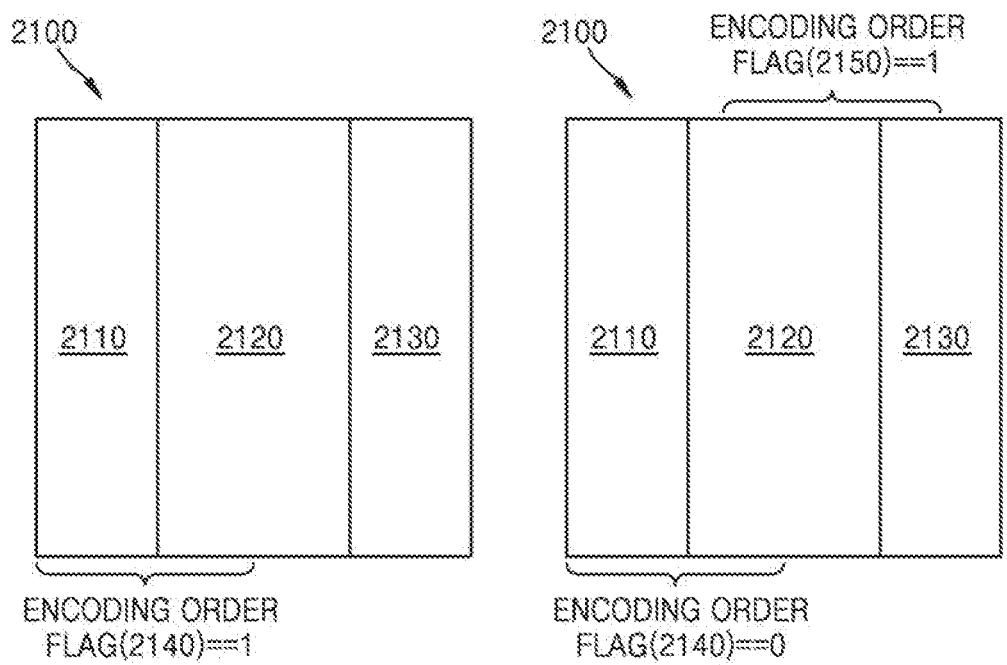
FIGS. 21A and 21B illustrate a method of determining an encoder order for a case in which a coding unit is split into three coding units.
Figure 21B:
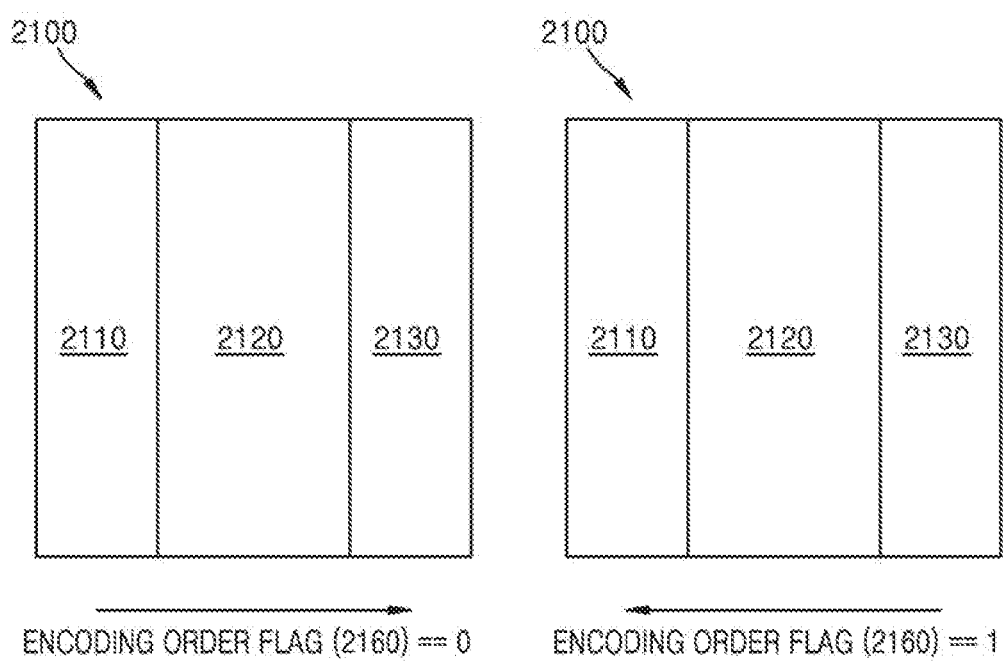

With reference to FIGS. 21A and 21B, it will be described how an encoding order of at least three blocks that are arrayed in a vertical or horizontal direction is changed according to the encoding order flag.

The encoding order determiner 1620 may obtain encoding order information from a bitstream. The encoding order information may be positioned after split information in the bitstream.

The encoding order determiner 1620 may internally determine the encoding order information according to an environment around a current block. The encoding order information may be determined according to whether neighboring blocks adjacent to the current block are encoded. For example, the encoding order determiner 1620 may determine a lower block to be first decoded from among lower blocks, the lower block having more neighboring blocks.

The encoding order information may be set to be equal to encoding order information that is applied to an upper block of the current block. For example, when the current block is a prediction unit or a transform unit, the encoding order determiner 1620 may apply encoding order information to the current block, the encoding order information having been applied to a coding unit including the current block. As another example, when the current block is a coding unit, the encoding order determiner 1620 may apply encoding order information to the current block, the encoding order information having been applied to a coding unit of which depth is lower than that of the current block.

When at least two encoding orders are present with respect to the current block, the encoding order determiner 1620 may obtain only one encoding order flag from the bitstream, and may determine the other encoding order flag to interoperate with the encoding order flag obtained from the bitstream.

The encoding order determiner 1620 may check encoding order change allowance information with respect to an upper data unit of the current block. The encoding order change allowance information indicates whether a change in an encoding order is allowable for blocks included in the upper data unit of the current block. When the encoding order change allowance information indicates that the change in the encoding order is not allowable, all blocks of the upper data unit are decoded according to a default encoding order. When the encoding order change allowance information indicates that encoding order information with respect to the current block has been encoded, the encoding order determiner 1620 may obtain the encoding order information.

When the encoding order change allowance information may be included in a video parameter set, a sequence parameter set, a picture parameter set, a slice segment header, a header of a largest coding unit, or the like. When at least two types of the encoding order information are present, two pieces of encoding order change allowance information regarding at least two types of the encoding order information may be separately stored in different headers.

The encoding order determiner 1620 may determine whether a change in an encoding order of a current block is allowable according to a depth or block size of the current block. For example, the encoding order determiner 1620 may obtain the encoding order information only when the depth of the current block is included in a depth for which a change in an encoding order is allowed. As another example, the encoding order determiner 1620 may obtain the encoding order information only when the block size of the current block is a block size for which a change in an encoding order is allowed.

The encoding order determiner 1620 may determine whether a change in an encoding order of the current block is allowed, according to a slice type of the current block. For example, when the current block corresponds to an I-type, the encoding order determiner 1620 may obtain encoding order information in a case that a depth of the current block is included in a depth range where the change in the encoding order is allowed for the I-type. As another example, when the current block corresponds to a P-type or a B-type, the encoding order determiner 1620 may obtain encoding order information in a case that the depth of the current block is included in a depth range where the change in the encoding order is allowed for the P-type or the B-type. Whether to allow a change in an encoding order according to each of depths, which is applied to each of slice types, may be determined based on coding efficiency.

The encoding order determiner 1620 may determine whether a change in an encoding order of the current block is allowed, according to a color component of the current block. For example, when the current block is a luma block, the encoding order determiner 1620 may obtain encoding order information in a case that the depth of the current block is included in a depth range in which the change in the encoding order is allowed for the luma block. Equally, when the current block is a chroma block, the encoding order determiner 1620 may obtain encoding order information in a case that the depth of the current block is included in a depth range in which the change in the encoding order is allowed for the chroma block. Whether to allow a change in an encoding order according to each of depths, which is applied to each of color components, may be determined based on coding efficiency.

The encoding order determiner 1620 may determine whether to allow the change in the encoding order of the current block, according to other characteristics of the current block, in addition to the aforementioned depth, block size, slice type, and color component of the current block.

The encoding order change allowance information may indicate the depth, block size, slice type, and color component of the current block for which the change in the encoding order is allowed. When the encoding order change allowance information does not include the depth, block size, slice type, and color component of the current block for which the change in the encoding order is allowed, whether to allow the change in the encoding order according to the depth, block size, slice type, and color component of the current block may be determined according to a preset default value.

The block decoder 1630 decodes lower blocks according to a decoding order. A decoding method performed by the block decoder 1630 may include the decoding method described with reference to FIGS. 2 and 5.

Figure 17:
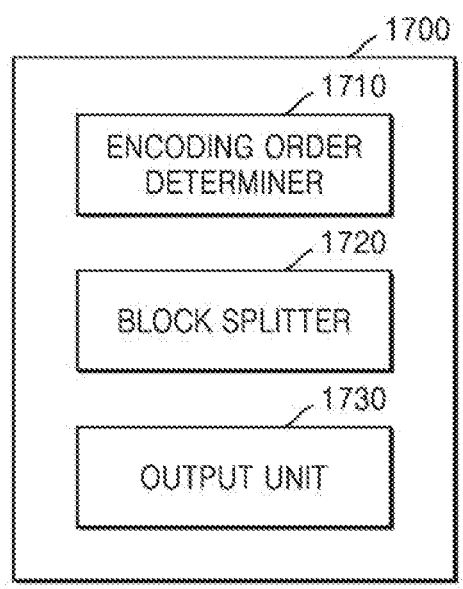
FIG. 17 illustrates a video encoding apparatus involving splitting a current block and determining an encoding order of split lower blocks, according to an exemplary embodiment.

FIG. 17 illustrates a video encoding apparatus 1700 involving splitting a current block and determining an encoding order of split lower blocks, according to an exemplary embodiment.

The video encoding apparatus 1700 includes an encoding order determiner 1710, a block splitter 1720, and an output unit 1730. Referring to FIG. 17, the encoding order determiner 1710, the block splitter 1720, and the output unit 1730 are formed as separate elements, but in an exemplary embodiment, the encoding order determiner 1710, the block splitter 1720, and the output unit 1730 may be integrated.

Referring to FIG. 17, the encoding order determiner 1710, the block splitter 1720, and the output unit 1730 are seen as elements located within one apparatus, but the encoding order determiner 1710, the block splitter 1720, and the output unit 1730 are not required to implemented in a signal apparatus. Thus, in an exemplary embodiment, the encoding order determiner 1710, the block splitter 1720, and the output unit 1730 may be dispersed.

In some embodiments, the encoding order determiner 1710, the block splitter 1720, and the output unit 1730 may be implemented by one processor. In some embodiments, the encoding order determiner 1710, the block splitter 1720, and the output unit 1730 may be implemented by a plurality of processors.

Functions performed by the encoding order determiner 1710, the block splitter 1720, and the output unit 1730 may be performed by the coding unit determiner 120 of FIG. 1A.

The encoding order determiner 1710 determines an encoding order of lower blocks of a current block. The encoding order determiner 1710 may determine encoding order candidates that are applicable to the lower blocks according to an encoding order determining method to be used by the encoding order determiner 1620 of FIG. 16. The encoding order determiner 1710 may compare coding efficiencies of the encoding order candidates and then may determine an optimal encoding order from among the encoding order candidates.

An encoding order that is applicable to the lower blocks may be limited according to a preset condition. If the encoding order is internally determined based on an environment around current blocks. A process of determining the encoding order candidates may be omitted.

When encoding order change allowance information with respect to the current block indicates that a change in an encoding order of the current block is allowed, the encoding order determiner 1710 may determine the encoding order of the current block to be different from a default encoding order. On the other hand, when the encoding order change allowance information with respect to the current block indicates that a change in the encoding order of the current block is not allowed, the encoding order determiner 1710 may determine the encoding order of the current block according to default encoding order.

In an exemplary embodiment, the encoding order determiner 1710 may determine the encoding order by analyzing neighboring blocks of the current block and a texture of the current block. Because the encoding order is determined according to a similarity of the texture, the coding efficiencies of the encoding order candidates are not always calculated. Therefore, calculation efficiency in the encoding process may be increased.

The block splitter 1720 compares coding efficiency of the current block with coding efficiency of lower blocks according to an encoding order, thereby determining whether to split the current block. When the efficiency of the current block is high, the block splitter 1720 determines split information to indicate that the current block is not split. On the other hand, when the coding efficiency of the lower blocks according to the encoding order is high, the block splitter 1720 determines the split information to indicate that the current block is split.

When the split information is determined to indicate that the current block is split, and an encoding order is determined from among the encoding order candidates, the encoding order determiner 1710 generates encoding order information indicating the encoding order from among the encoding order candidates for the lower blocks.

When at least two split methods can be used for the current block, the block splitter 1720 may select an optimal split method according to coding efficiency, the optimal split method being from among the split methods that can be used for the current block. The block splitter 1720 may compare coding efficiencies of optimal encoding orders with respect to the split methods, respectively, thereby selecting the optimal split method. The block splitter 1720 may compare coding efficiency of the lower blocks according to the optimal split method and the optimal encoding order with coding efficiency of the current block, thereby determining coding efficiency of the current block. The block splitter 1720 of FIG. 17 may use a split method used by the block splitter 1610 of FIG. 16.

It is ideal when the encoding order determiner 1710 and the block splitter 1720 search for an optimal split method and encoding order by performing encoding according to all split methods and encoding orders. However, calculation for encoding may be significantly increased, thus, the encoding order determiner 1710 and the block splitter 1720 may be set to limit split methods and encoding orders allowed for the current block or may be set to first search for an optimal split method and then to search for an optimal encoding order with respect to the optimal split method.

The output unit 1730 includes, in a bitstream, the split information indicating whether to split the current block. When an encoding order of the current block is determined from among at least two encoding order candidates, the output unit 1730 may also include encoding order information in the bitstream.

The encoding order determiner 1710 and the block splitter 1720 of FIG. 17 may perform functions of the coding unit determiner 120 of FIG. 1A. The output unit 1730 of FIG. 17 may perform functions of the output unit 130 of FIG. 1A.

FIGS. 18A through 18C illustrate a default encoding order according to an exemplary embodiment. The default encoding order of FIGS. 18A through 18C is a Z encoding order. According to the Z encoding order, data units are encoded from the left to the right, and when data units in a current row are all encoded, data units included in a row below the current row are encoded from the left to the right. The aforementioned Z encoding order is referred to as a raster scan order.

FIG. 18A illustrates encoding orders according to the Z encoding order of largest coding units included in a current picture 1800. According to the Z encoding order, indexes 0 through 15 are set to the largest coding units. According to the Z encoding order, the largest coding units that have the indexes 0 through 3 and are included in a first row are first encoded, and the largest coding units that have the indexes 4 through 7 and are included in a second row are encoded from the left to the right. The largest coding units are internally encoded according to the Z encoding order.

FIG. 18B illustrates an encoding order of a largest coding unit 1810 having an index 6 from among the largest coding units included in the current picture 1800. The indexes 0 through 15 are set to coding units having a final depth and being split according to the Z encoding order. The Z encoding order is applied to data units having an equal depth. Until lower coding units of a coding unit having a depth n are all encoded, a last coding unit having the depth n is not encoded. For example, until the coding units having the indexes 5 through 14 are all encoded, the coding unit having the index 15 is not encoded. The coding units are also internally encoded according to the Z encoding order.

FIG. 18C illustrates a reference sample referred to by a coding unit 1824 having the index 6 from among coding units included in the largest coding unit 1810. Only a coding unit 1812 having the index 0 and a coding unit 1822 having the index 5 are reconstructed around the coding unit 1824 having the index 6 that is being encoded. Thus, only pixels 1850 of the coding unit 1812 and pixels 1860 of the coding unit 1822 may be used as reference pixels for the coding unit 1824.

The Z encoding order of FIGS. 18A through 18C may be applied in a different direction according to data units. For example, the Z encoding order may be changed to allow the data units in an equal row to be encoded from the right to the left. In addition, the Z encoding order may be changed in such a manner that, after data units in a current row are all encoded, data units included in a row above the current row are to be encoded. In addition, the Z encoding order may be changed in such a manner that data units in an equal column are encoded from the top to the bottom, and then, after the data units in a current column are all encoded, data units included in a right column of the current column are to be encoded.

Figure 19A:
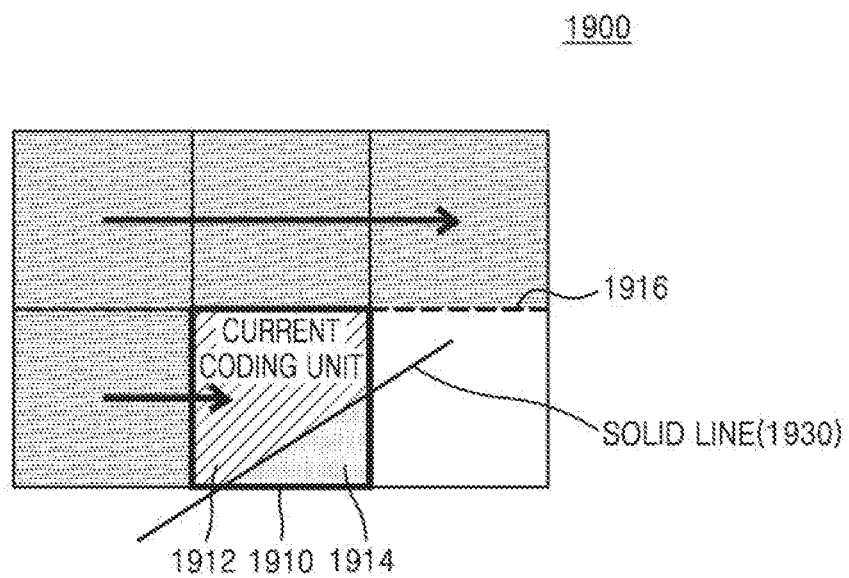
FIGS. 19A and 19B illustrate a case in which a coding unit is encoded in a forward direction and a case in which a coding unit is encoded in an inverse direction.
Figure 19B:
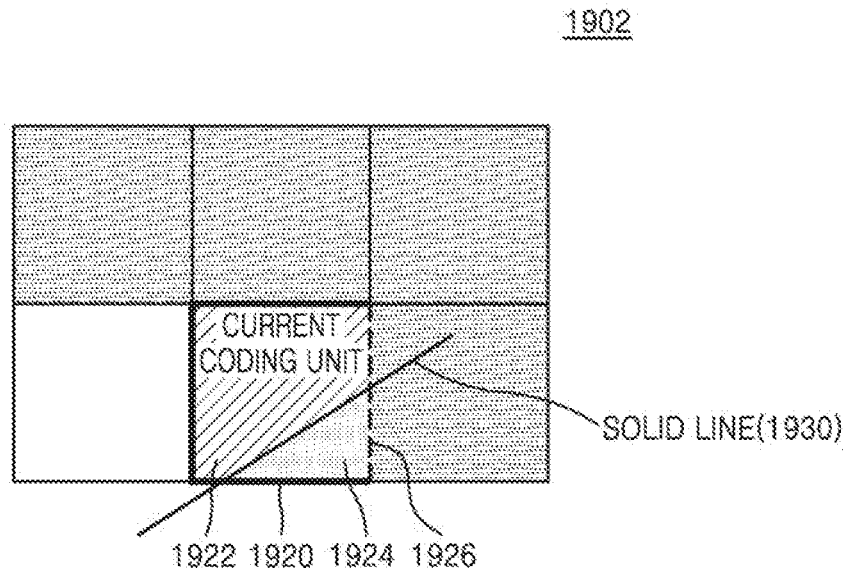

FIGS. 19A and 19B illustrate a case 1900 in which a coding unit 1910 is encoded in a forward direction and a case 1920 in which a coding unit 1920 is encoded in an inverse direction. With reference to FIGS. 19A and 19B, an effect of changing an encoding order will now be described.

The coding units 1910 and 1920 of FIGS. 19A and 19B are predicted according to an intra mode in an upper right direction. A solid line 1930 of FIGS. 19A and 19B corresponds to pixels that are arrayed in a straight line in an original image and have a constant value. Thus, when a current coding unit is predicted in a direction of the solid line 1930, accuracy of prediction with respect to the coding units 1910 and 1920 may be improved.

In the case that encoding is performed in the forward direction, a left coding unit, an upper coding unit and an upper right coding unit of the current coding unit 1910 are reconstructed prior to the current coding unit 1910. Therefore, the current coding unit 1910 refers to pixels or encoding information of the left coding unit, the upper coding unit, and the upper right coding unit. For example, pixels 1916 at a bottom corner of the upper right coding unit are used in predicting the current coding unit 1910. Because the pixels 1916 are spatially distant from the current coding unit 1910, accuracy of prediction with respect to a portion 1914 of the current coding unit 1910 may be low.

However, in the that encoding is performed in the inverse direction, a right coding unit, the upper coding unit and an upper left coding unit of the current coding unit 1910 are reconstructed prior to the current coding unit 1920, thus, during intra prediction, pixels 1926 at a left corner of the right coding unit may be used in predicting the current coding unit 1920. Because the pixels 1926 are adjacent to the current coding unit 1920, accuracy of prediction with respect to a portion 1924 of the current coding unit 1920 may be improved compared to the accuracy of prediction with respect to the portion 1914 of the current coding unit 1910.

As in the embodiment regarding the intra prediction described with reference to FIGS. 19A and 19B, for inter prediction, many cases in which accuracy of prediction may be improved by obtaining encoding information from a block positioned in an inverse direction are present. If a current coding unit and a right coding unit of the current coding unit are coding units regarding a same object, motion information of the current coding unit may be similar to motion information of the right coding unit. Therefore, coding efficiency may be improved by deriving the motion information of the current coding unit from the motion information of the right coding unit.

Thus, when an encoding order is determined by comparing coding efficiency of a case where the current coding unit is encoded in the forward direction with coding efficiency of a case where the current coding unit is encoded in the inverse direction, coding efficiency of an image may be improved.

FIG. 20 illustrates a tree structure of a largest coding unit 2050, which is for describing an encoding order of the largest coding unit 2050 and coding units included in the largest coding unit 2050.

The largest coding unit 2050 is split into a plurality of coding units 2056, 2058, 2060, 2062, 2068, 2070, 2072, 2074, 2080, 2082, 2084, and 2086. The largest coding unit 2050 corresponds to an uppermost node 2000 of the tree structure. The coding units 2056, 2058, 2060, 2062, 2068, 2070, 2072, 2074, 2080, 2082, 2084, and 2086 correspond to a plurality of nodes 2006, 2008, 2010, 2012, 2018, 2020, 2022, 2024, 2030, 2032, 2034, 2036, respectively. Upper encoding order flags 2002, 2014, and 2026 indicating an encoding order in the tree structure correspond to arrows 2052, 2064, and 2076, and lower encoding order flags 2004, 2016, and 2028 correspond to arrows 2054, 2066, and 2078.

An upper encoding order flag indicates an encoding order of two coding units from among four coding units having an equal depth, the two coding units being positioned at an upper level. If the upper encoding order flag is 0, encoding is performed in a forward direction. On the other hand, if the upper encoding order flag is 1, the encoding is performed in an inverse direction.

Equally, a lower encoding order flag indicates an encoding order of two coding units from among four coding units having an equal depth, the two coding units being positioned at a lower level. If the lower encoding order flag is 0, encoding is performed in a forward direction. On the other hand, if the lower encoding order flag is 1, the encoding is performed in an inverse direction.

For example, because the upper encoding order flag 2014 is 0, an encoding order of the coding units 2068 and 2070 is determined to be a forward direction from the left to the right. In addition, because the lower encoding order flag 2016 is 1, an encoding order of the coding units 2072 and 2074 is determined to be an inverse direction from the right to the left.

In an exemplary embodiment, the upper encoding order flag and the lower encoding order flag may be set to have an equal value. For example, when the upper encoding order flag 2002 is determined to be 1, the lower encoding order flag 2004 corresponding to the upper encoding order flag 2002 may be determined to be 1. Because values of the upper encoding order flag and the lower encoding order flag are determined to be 1 bit, an information amount of encoding order information is decreased.

In an exemplary embodiment, an upper encoding order flag and a lower encoding order flag of a current coding unit may be determined by taking into account at least one of an upper encoding order flag and a lower encoding order flag that are applied to a coding unit having a depth lower than that of the current coding unit. For example, the upper encoding order flag 2026 and the lower encoding order flag 2028 that are applied to the coding units 2080, 2082, 2084, and 2086 may be determined based on the lower encoding order flag 2016 that is applied to the coding units 2072 and 2074. Thus, the upper encoding order flag 2026 and the lower encoding order flag 2028 may be determined to have a value equal to that of the lower encoding order flag 2016. Because values of an upper encoding order flag and a lower encoding order flag are determined from an upper coding unit of a current coding unit, encoding order information is not obtained from a bitstream. Accordingly, an information amount of the encoding order information is decreased.

FIGS. 21A and 21B illustrate a method of determining an encoder order for a case in which a coding unit is split into three coding units.

FIG. 21A illustrates an exemplary embodiment related to a method of swapping an encoding order according to encoding order flags only when encoding orders of spatially-neighboring coding units are adjacent to each other.

A coding unit 2100 is split into three coding units 2110, 2120, and 2130. When a default encoding order is from the left to the right, encoding is performed in an order of the coding unit 2110, the coding unit 2120, and the coding unit 2130. However, an encoding order may be changed according to encoding order flags 2140 and 2150.

The encoding order flag 2140 indicates an encoding order of the coding unit 2110 and the coding unit 2120. When the encoding order flag 2140 is 0, the encoding order of the coding unit 2110 and the coding unit 2120 is determined to be a forward direction. Therefore, the coding unit 2110 is encoded prior to the coding unit 2120. However, when the encoding order flag 2140 is 1, the encoding order of the coding unit 2110 and the coding unit 2120 is determined to be an inverse direction, thus, the coding unit 2120 is encoded prior to the coding unit 2110.

The encoding order flag 2150 indicates an encoding order of the coding unit 2120 and the coding unit 2130. The encoding order flag 2150 is obtained when the encoding order flag 2140 indicates the forward direction. When the encoding order flag 2140 indicates the inverse direction, encoding orders of the coding unit 2120 and the coding unit 2130 are not adjacent, thus, the encoding order flag 2150 is not obtained. When the encoding order flag 2150 is 0, an encoding order of the coding unit 2120 and the coding unit 2130 is determined to be a forward direction. Thus, the coding unit 2120 is encoded prior to the coding unit 2130. However, when the encoding order flag 2150 is 1, the encoding order of the coding unit 2120 and the coding unit 2130 is determined to be an inverse direction, thus, the coding unit 2130 is encoded prior to the coding unit 2120.

According to the embodiment of FIG. 21A, an encoding order of three coding units includes three cases. Thus, in order to determine the encoding order, one or two encoding order flags are used, FIG. 21B illustrates an exemplary embodiment related to a method of determining an encoding order, based on an encoding order flag 2160 indicating a direction of the encoding order to be applied to three coding units. The encoding order flag 2160 indicates whether the encoding order is a forward direction or an inverse direction. For example, when the encoding order flag 2160 is 0, an encoding order of the coding units 2110, 2120, and 2130 may be determined to be a forward direction. Thus, when the encoding order flag 2160 is 0, encoding may be performed in an order of the coding unit 2110, the coding unit 2120, and the coding unit 2130.

When the encoding order flag 2160 is 1, the encoding order of the coding units 2110, 2120, and 2130 may be determined to be an inverse direction. Thus, the encoding order flag 2160 is 1, encoding may be performed in an order of the coding unit 2130, the coding unit 2120, and the coding unit 2110.

According to the embodiment of FIG. 21B, an encoding order of three coding units includes two cases. Thus, in order to determine the encoding order, one encoding order flag is used.

The methods of determining an encoder order, which are used in the embodiments of FIGS. 21A and 21B, may be applied to four or more coding units.

Figure 22:
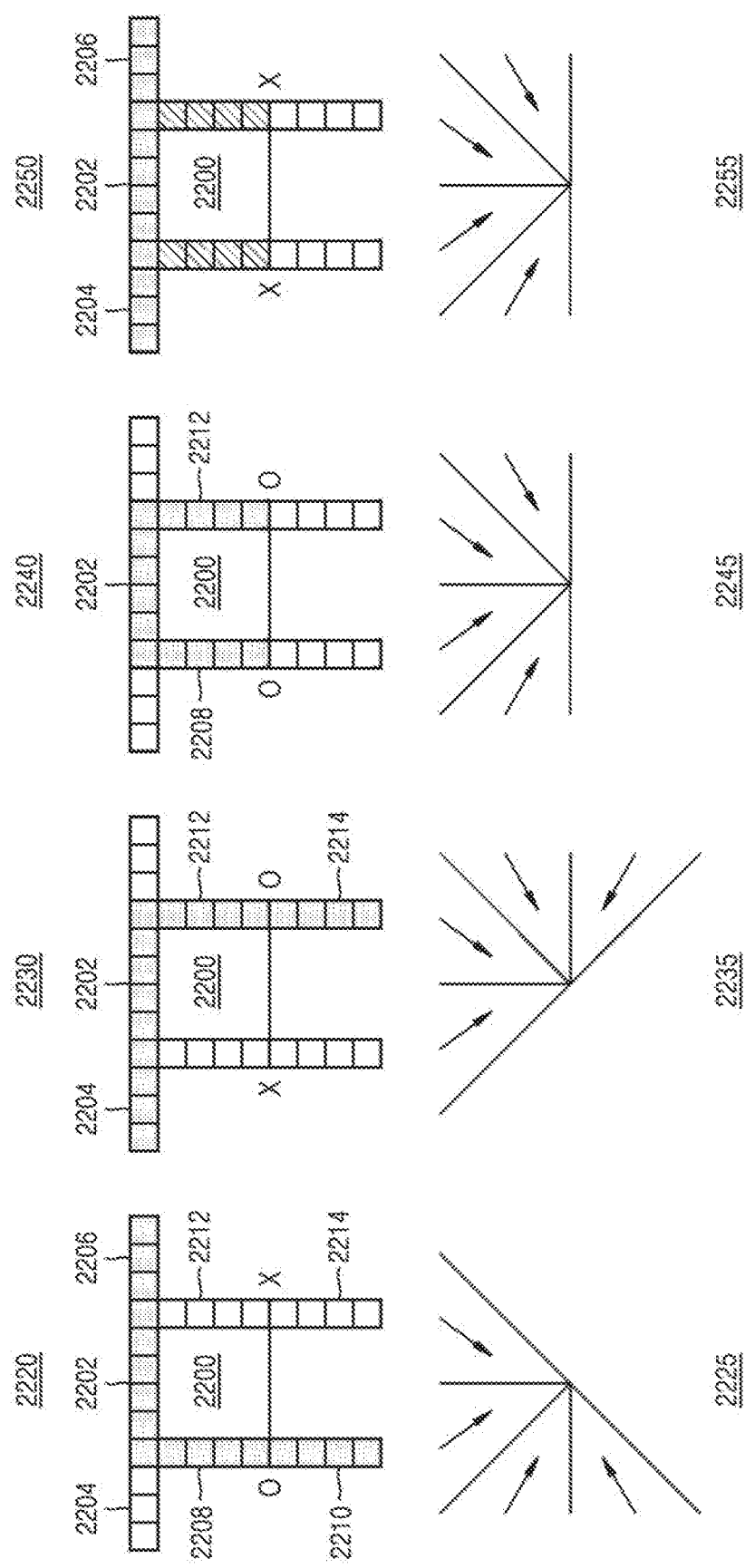
FIGS. 22 and 23 illustrate a method of predicting a current block, the method being different according to whether right and left blocks are reconstructed.
Figure 23:
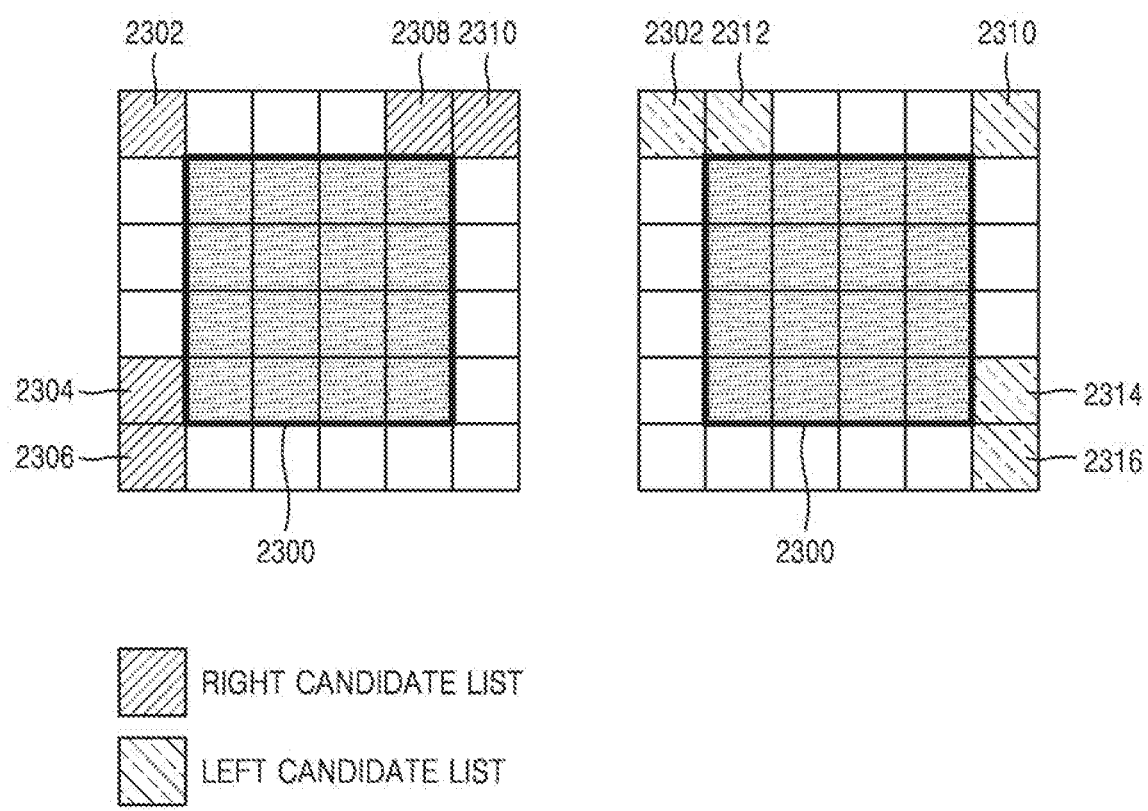

FIGS. 22 and 23 illustrate a method of predicting a current block, the method being different according to whether right and left blocks are reconstructed. FIG. 22 illustrates a case in which a current block 2200 is predicted according to an intra mode. FIG. 23 illustrates a case in which a current block 2300 is predicted according to an inter mode. The current blocks 2200 and 2300 are coding units or prediction units that are being predicted.

With reference to FIG. 22, a first embodiment 2220 illustrates reference pixels 2202, 2206, 2208, and 2210 used in intra prediction when blocks in an upper row and a left block are reconstructed. In the first embodiment 2220, the reference pixels 2202 and 2206 of the reconstructed upper blocks and the reference pixels 2208 of the reconstructed left block may be used in the intra prediction. The reference pixels 2210 of a lower left block may be used only when the lower left block is reconstructed. In order to use the reference pixels 2202, 2206, 2208, and 2210, prediction directions included in a first intra prediction direction group 2225 may be used in intra predicting the current block 2200.

A second embodiment 2230 illustrates reference pixels 2202, 2204, 2212, and 2214 used in intra prediction when blocks in an upper row and a right block are reconstructed. In the second embodiment 2230, the reference pixels 2202 and 2204 of the reconstructed upper blocks and the reference pixels 2212 of the reconstructed right block may be used in the intra prediction. The reference pixels 2214 of a lower right block may be used only when the lower right block is reconstructed. In order to use the reference pixels 2202, 2204, 2212, and 2214, prediction directions included in a second intra prediction direction group 2235 may be used in intra predicting the current block 2200.

A third embodiment 2240 illustrates reference pixels 2202, 2208, and 2212 used in intra prediction when an upper block, a right block, and a left block are reconstructed. In the third embodiment 2240, the reference pixels 2202 of the upper block, the reference pixels 2208 of the left block, and the reference pixels 2212 of the right block may be used in the intra prediction. Prediction directions included in a third intra prediction direction group 2245 may be used in intra predicting the current block 2200.

According to the first embodiment 2220 and the second embodiment 2230, when the reference pixels 2210 of the lower left block and the reference pixels 2214 of the lower right block cannot be used, accuracy of prediction may deteriorate. However, in the third embodiment 2240, the used reference pixels 2202, 2208, and 2212 are all adjacent to the current block, thus, accuracy of prediction may be relatively high, compared to other embodiments.

A fourth embodiment 2250 illustrates reference pixels 2202, 2204, and 2206 used in intra prediction when only blocks in an upper row are reconstructed. In the fourth embodiment 2250, only the reference pixels 2202, 2204, and 2206 of the reconstructed upper blocks may be used in the intra prediction. Prediction directions included in a fourth intra prediction direction group 2255 may be used in intra predicting the current block 2200.

Unlike the third embodiment 2240, in the fourth embodiment 2250, the reference pixel 2202 of the upper block is the only pixel that is adjacent to the current block 2200. Because the reference pixels 2204 and 2206 are spatially distant from the current block 2200, accuracy of prediction may deteriorate, compared to the first, second, and third embodiments 2220, 2230, and 2240. Therefore, the intra prediction used in the fourth embodiment 2250 may be a vertical mode or a directional prediction mode in a direction adjacent to the vertical mode which uses the reference pixel 2202 of the upper block that is adjacent to the current block 2200.

In the Z encoding order, the intra prediction according to the first embodiment 2220 is used, but when an encoding order of two horizontally-neighboring blocks is swapped, a right block may be first predicted according to the intra prediction of the fourth embodiment 2250. After the right block is reconstructed, a left block may be reconstructed by being predicted according to the intra prediction of the third embodiment 2240.

In prediction according to the planar mode or the DC mode, a reference pixel to be used may be differently determined according to whether a left block and a right block are reconstructed.

In FIG. 23, only when a left block of the current block 2300 is reconstructed, blocks including reference pixels 2302, 2304, 2306, 2308, and 2310 are determined to be motion vector candidates of a first candidate list. One motion vector candidate may be selected from among the motion vector candidates of the first candidate list, and a plurality of pieces of encoding information such as a motion vector, a reference picture index, or the like which are required for inter prediction may be obtained from the selected motion vector candidate.

When a right block of the current block 2300 is only reconstructed, blocks including reference pixels 2302, 2310, 2312, 2314, and 2316 are determined to be motion vector candidates of a second candidate list. One motion vector candidate may be selected from among the motion vector candidates of the second candidate list, and a plurality of pieces of encoding information such as a motion vector, a reference picture index, or the like which are required for inter prediction may be obtained from the selected motion vector candidate.

When the left and right blocks of the current block 2300 are all reconstructed, an efficient candidate list from among the second candidate list and the first candidate list may be selected. Afterward, a motion vector candidate may be determined from the selected candidate list. In an exemplary embodiment, when the left and right blocks of the current block 2300 are all reconstructed, a third candidate list that is different from the first candidate list and the second candidate list may be generated. For example, blocks including reference pixels 2302, 2304, 2310, 2312, and 2314 may be included, as motion vector candidates, in the third candidate list.

When the left and right blocks of the current block 2300 are not reconstructed, encoding information cannot be obtained from the left and right blocks. Therefore, a fourth candidate list including blocks as a motion vector candidate, the blocks being in an upper row of the current block 2300, may be used. For example, blocks including reference pixels 2302, 2308, 2310, and 2312 may be included, as motion vector candidates, in the fourth candidate list.

In the Z encoding order, the inter prediction according to the first candidate list may be used. However, when an encoding order of two horizontally-neighboring blocks is swapped, a right block may be first inter-predicted according to the second candidate list or the fourth candidate list. After the right block is reconstructed, a left block may be reconstructed by being inter-predicted according to one of the second candidate list and the third candidate list.

Figure 24:
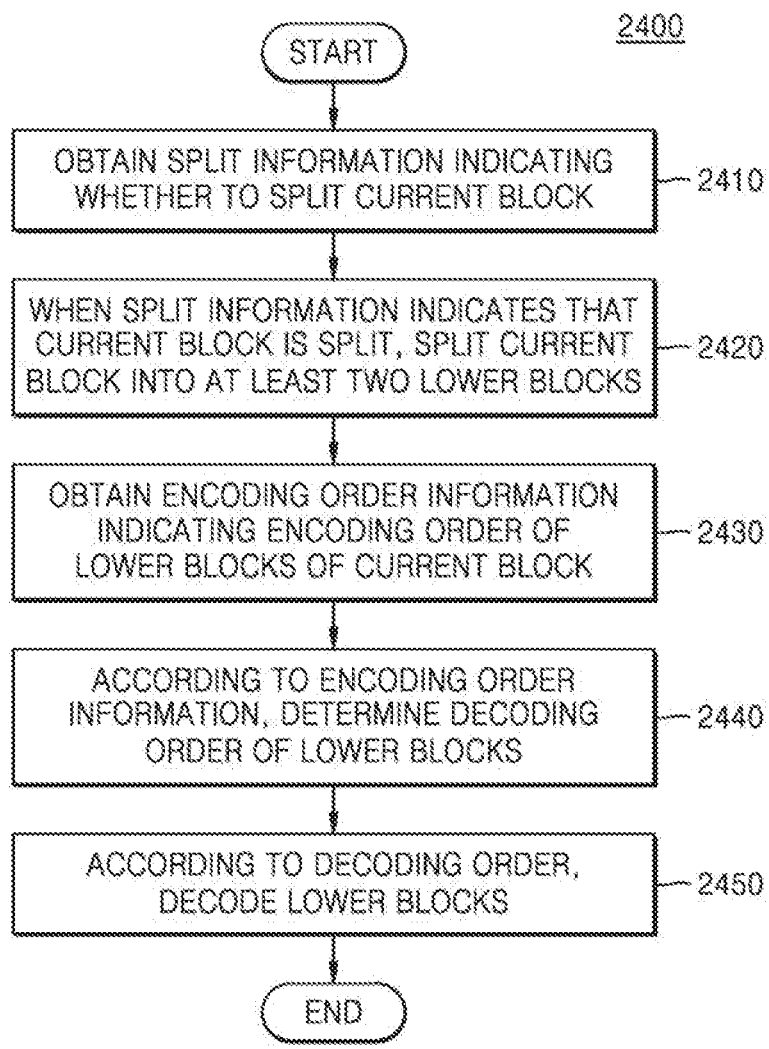
FIG. 24 illustrates a video decoding method performed by the video decoding apparatus, according to an exemplary embodiment.

FIG. 24 illustrates a video decoding method performed by the video decoding apparatus 1600, according to an exemplary embodiment.

In operation 2410, split information indicating whether to split a current block is obtained. When at least two split methods are allowed for a shape of the current block, split shape information indicating a split method with respect to the current block may be obtained.

In operation 2420, when the split information indicates that the current block is split, the current block is split into at least two lower blocks. The current block may be split according to the split method indicated by the split shape information.

In operation 2430, encoding order information indicating an encoding order of the lower blocks of the current block is obtained. The encoding order information may be obtained from a bitstream or may be internally determined according to an environment around the current block. The encoding order information may be determined when encoding order change allowance information obtained with respect to an upper data unit of the current block indicates that the encoding order of the current block is changeable.

In operation 2440, according to the encoding order information, a decoding order of the lower blocks is determined.

In operation 2450, according to the decoding order, the lower blocks are decoded.

Figure 25:
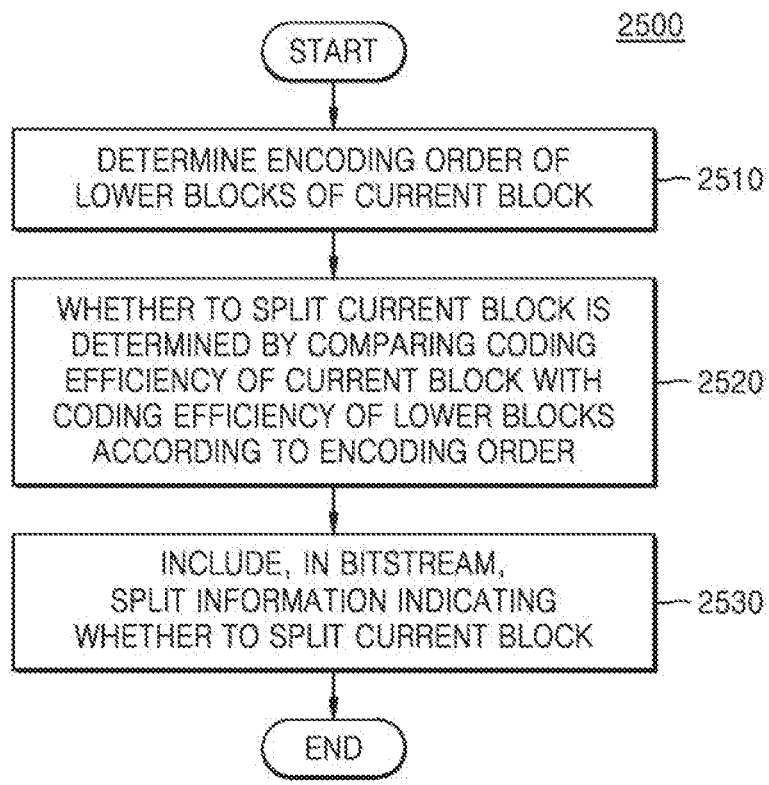
FIG. 25 illustrates a video encoding method performed by the video encoding apparatus, according to an exemplary embodiment.

FIG. 25 illustrates a video encoding method performed by the video encoding apparatus 1700, according to an exemplary embodiment.

In operation 2510, an encoding order of lower blocks of a current block is determined. The encoding order of the lower blocks may be selected from usable encoding order candidates or may be internally determined according to an environment around the current block. When encoding order change allowance information that is set with respect to an upper data unit of the current block indicates that the encoding order of the current block is not changeable, operation 2510 may be omitted.

In operation 2520, whether to split the current block is determined by comparing coding efficiency of the current block with coding efficiency of the lower blocks according to the encoding order. When at least two split methods can be used for the current block, an optimal split method may be selected. Based on the optimal split method and by comparing the coding efficiency of the lower blocks according to the encoding order with the coding efficiency of the current block, whether to split the current block may be determined.

In operation 2530, split information indicating whether to split the current block is included in a bitstream. When the encoding order of the lower blocks is selected from the encoding order candidates, encoding order information indicating the selected encoding order from among the encoding order candidates may be included in the bitstream.

According to the video encoding technique based on coding units having a tree structure which is described with reference to FIGS. 1 through 25, image data of a spatial domain is encoded in each of the coding units having a tree structure, and decoding is performed on each largest coding unit according to the video decoding technique based on coding units having a tree structure so that the image data of the spatial domain is reconstructed, and by doing so, a picture and a video that is a picture sequence may be reconstructed. The reconstructed video may be reproduced by a reproducing apparatus, may be stored in a storage medium, or may be transmitted through a network.

The embodiments according to the present disclosure may be written as computer programs and may be implemented in general-use digital computers that execute the programs using a non-transitory computer-readable recording medium.

While the best embodiments of the present disclosure have been described, it will be understood by one of ordinary skill in the art that various replacements, modifications, or changes with respect to the present disclosure may be made therein without departing from the spirit and scope as defined by the following claims. That is, the claims will be construed as including the various replacements, modifications, or changes with respect to the present disclosure. Therefore, the descriptions provided in the specification and drawings should be considered in a descriptive sense only and not for purposes of limitation.

What is claimed is:

1. A video decoding apparatus comprising:
a block splitter configured to obtain split information indicating whether to split a current block into four lower blocks by dividing a width and a height of the current block in half, and, when the split information indicates to split the current block, split the current block into the four lower blocks;
an encoding order determiner configured to obtain encoding order information indicating an encoding order in which the four lower blocks of the current block are encoded, and to determine a decoding order of the four lower blocks according to the encoding order indicated by the encoding order information; and
a decoder configured to decode the four lower blocks according to the decoding order,
wherein, the encoding order information indicates one of a forward direction and an inverse direction,
when the encoding order information indicates the forward direction, the decoder decodes a first set of two lower blocks in an upper row of the four lower blocks from a left block to a right block among the first set, and decodes a second set of two lower blocks in a lower row of the four lower blocks from a left block to a right block among the second set, and decodes the first set of two lower blocks in the upper row prior to the second set of two lower blocks in the lower row, and
when the encoding order information indicates the inverse direction, the decoder decodes the first set of two lower blocks in the upper row from the right block to the left block among the first set, and decodes the second set of two lower blocks in the lower row from the right block to the left block among the second set, and the decoder decodes the first set of two lower blocks in the upper row is decoded prior to the second set of two lower blocks in the lower row.

2. A video encoding apparatus comprising:
a block splitter configured to determine whether to split a current block into four lower blocks by dividing a width and a height of the current block in half;
an encoding order determiner configured to determine an encoding order of lower blocks of the current block; and
an output unit configured to generate a bitstream comprising split information indicating whether to split the current block into the four lower blocks by dividing the width and the height of the current block in half, and encoding order information indicating the encoding order of the four lower blocks of the current block when it is determined that the current block is split into the four lower blocks,
wherein, the encoding order of the four lower blocks of the current block is determined as one of a forward direction and an inverse direction,
when the encoding order is determined as the forward direction, a first set of two lower blocks in an upper row of the four lower blocks is encoded from a left block to a right block among the first set, a second set of two lower blocks in a lower row of the four lower blocks is encoded from a left block to a right block among the second set, and the first set of two lower blocks in the upper row is encoded prior to the second set of two lower blocks in the lower row, and
when the encoding order is determined as the inverse direction, the first set of two lower blocks in the upper row is encoded from the right block to the left block among the first set, the second set of two lower blocks in the lower row is encoded from the right block to the left block among the second set, and the first set of two lower blocks in the upper row is encoded prior to the second set of two lower blocks in the lower row.

* * * * *